United States Patent
Han et al.

(10) Patent No.: US 12,160,670 B2
(45) Date of Patent: Dec. 3, 2024

(54) HIGH DYNAMIC RANGE (HDR) IMAGE GENERATION USING A COMBINED SHORT EXPOSURE IMAGE

(71) Applicant: QUALCOMM Incorporated, San Diego, CA (US)

(72) Inventors: Kevin Yao Han, San Diego, CA (US); Narayana Karthik Ravirala, San Diego, CA (US); Satyajit Giri, San Diego, CA (US); Shizhong Liu, San Diego, CA (US); Weiliang Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 328 days.

(21) Appl. No.: 17/744,454

(22) Filed: May 13, 2022

(65) Prior Publication Data

US 2023/0370727 A1    Nov. 16, 2023

(51) Int. Cl.
*H04N 23/741* (2023.01)
*H04N 23/73* (2023.01)

(52) U.S. Cl.
CPC ......... *H04N 23/741* (2023.01); *H04N 23/73* (2023.01)

(58) Field of Classification Search
CPC ..... H04N 23/741; H04N 23/73; H04N 23/743
See application file for complete search history.

(56) References Cited

U.S. PATENT DOCUMENTS

| 9,131,201 | B1 * | 9/2015 | Geiss | H04N 25/589 |
| 2018/0160062 | A1 * | 6/2018 | Shigeta | H04N 25/583 |
| 2019/0222766 | A1 * | 7/2019 | Molgaard | H04N 23/6845 |
| 2020/0396370 | A1 * | 12/2020 | Zhen | G06T 5/92 |
| 2023/0276136 | A1 * | 8/2023 | Cui | H04N 23/72 |
| | | | | 348/226.1 |

* cited by examiner

*Primary Examiner* — Nhan T Tran
(74) *Attorney, Agent, or Firm* — Polsinelli LLP

(57) ABSTRACT

Disclosed are systems, apparatuses, processes, and computer-readable media to capture images with subjects at different depths of fields. A method of processing image data includes capturing an image associated with a first exposure; capturing a plurality of images associated with at least a second exposure, the second exposure being less than the first exposure; generating a combined image from the plurality of images associated with at least the second exposure; and generating a high dynamic range (HDR) image from the image associated with the first exposure and the combined image.

30 Claims, 24 Drawing Sheets

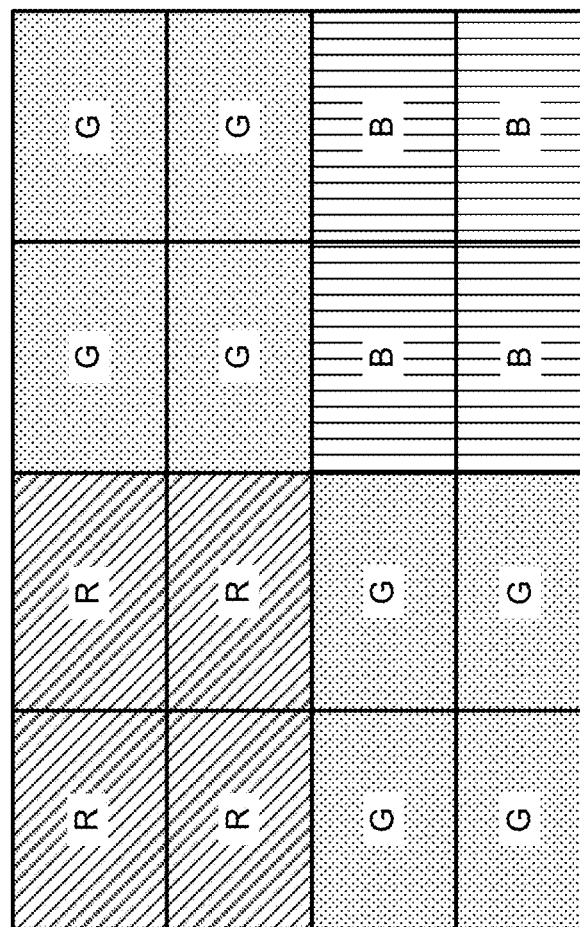

HIGH DYNAMIC RANGE (HDR) IMAGE GENERATION USING A COMBINED SHORT EXPOSURE IMAGE

FIELD

The present disclosure generally relates to image processing. For example, aspects of the present disclosure relate to systems and techniques for generating a high dynamic range (HDR) image with a combined short exposure image.

BACKGROUND

A camera is a device that receives light and captures image frames, such as still images or video frames, using an image sensor. Cameras may include processors, such as image signal processors (ISPs), that can receive one or more image frames and process the one or more image frames. For example, a raw image frame captured by a camera sensor can be processed by an ISP to generate a final image. Cameras can be configured with a variety of image capture and image processing settings to alter the appearance of an image. Some camera settings are determined and applied before or during capture of the photograph, such as ISO, exposure time, aperture size, f/stop, shutter speed, focus, and gain. Other camera settings can configure post-processing of a photograph, such as alterations to contrast, brightness, saturation, sharpness, levels, curves, or colors.

Cameras can be configured with a variety of image capture and image processing settings. Application of different settings can result in frames or images with different appearances. Some camera settings are determined and applied before or during capture of the photograph, such as ISO, exposure time (also referred to as exposure duration), aperture size, f/stop, shutter speed, focus, and gain. Other camera settings can configure post-processing of a photograph, such as alterations to contrast, brightness, saturation, sharpness, levels, curves, or colors.

SUMMARY

In some examples, systems and techniques are described for generating a high dynamic range (HDR) image using a combined short exposure image. The systems and techniques can result in a reduction of ghosting and can improve image quality of HDR images.

In some examples, systems and techniques are described for capturing images. Disclosed are systems, apparatuses, methods, and computer-readable media for capturing one or more images. According to at least one example, a method is provided for capturing one or more images. The method includes: capturing an image associated with a first exposure; capturing a plurality of images associated with at least a second exposure, the second exposure being less than the first exposure; generating a combined image from the plurality of images associated with at least the second exposure; and generating an HDR image from the image associated with the first exposure and the combined image.

In another example, an apparatus for capturing one or more images is provided that includes at least one memory and at least one processor coupled to the at least one memory. The at least one processor is configured to: capture an image associated with a first exposure; capture a plurality of images associated with at least a second exposure, the second exposure being less than the first exposure; generate a combined image from the plurality of images associated with at least the second exposure; and generate an HDR image from the image associated with the first exposure and the combined image.

In another example, a non-transitory computer-readable medium is provided that has stored thereon instructions that, when executed by one or more processors, cause the one or more processors to: capture an image associated with a first exposure; capture a plurality of images associated with at least a second exposure, the second exposure being less than the first exposure; generate a combined image from the plurality of images associated with at least the second exposure; and generate an HDR image from the image associated with the first exposure and the combined image.

In another example, an apparatus for capturing one or more images is provided. The apparatus includes: means for capturing an image associated with a first exposure; means for capturing a plurality of images associated with at least a second exposure, the second exposure being less than the first exposure; means for generating a combined image from the plurality of images associated with at least the second exposure; and means for generating an HDR image from the image associated with the first exposure and the combined image.

In some aspects, the plurality of images associated with at least the second exposure comprises at least one image captured before the image and at least one image captured after the image.

In some aspects, the plurality of images associated with at least the second exposure comprises at least two images associated the second exposure.

In some aspects, the plurality of images associated with at least the second exposure comprises at least one image associated the second exposure and at least one image associated a third exposure that is different from the second exposure and less than the first exposure.

In some aspects, one or more of the methods, apparatuses, and computer-readable medium described above further comprise: merging the plurality of images based on a maximum saturation.

In some aspects, the plurality of images includes a plurality of regions, and wherein generating the combined image comprises: for each region of the plurality of regions in the plurality of images, determining a region from one image of the plurality of images having a highest luma value; and generating the combined image using the determined region. In some aspects, each region is a single pixel.

In some aspects, one or more of the methods, apparatuses, and computer-readable medium described above further comprise: determining scaled luma values of pixels in the combined image using an exposure ratio; determining that the image associated with the first exposure is saturated; and detecting motion in the combined image.

In some aspects, the determining of the scaled luma values includes multiplying luma values of the pixels in the combined image by the exposure ratio.

In some aspects, the exposure ratio is based on a comparison of the first exposure and at least the second exposure.

In some aspects, one or more of the methods, apparatuses, and computer-readable medium described above further comprise: determining that the image associated with the first exposure is saturated comprises determining that a threshold number of pixels of the image have a luma value greater than a threshold value.

In some aspects, the motion is detected based on a comparison of the image associated with the first exposure to a particular image from the plurality of images associated with at least the second exposure.

In some aspects, the scaled luma values are less than luma values of pixels in the image associated with the first exposure when luma values of at least a threshold number of pixels of the image associated with the first exposure are greater than the scaled luma values.

In some aspects, one or more of the methods, apparatuses, and computer-readable medium described above further comprise: generating second scaled luma values at least in part by scaling a luma value of each pixel of a particular image from the plurality of images associated with at least the second exposure by the exposure ratio; determining a number of different pixels between the particular image and the image associated with the first exposure at least in part by comparing the scaled luma values of the particular image to a luma value of each pixel of the image associated with the first exposure; and detecting the motion when the number of different pixels is greater than a threshold value.

In some aspects, one or more of the methods, apparatuses, and computer-readable medium described above further comprise: generating a motion mask from the plurality of images associated with at least the second exposure; determining a region in the motion mask corresponding to a first set of pixels at least in part by comparing the first set of pixels with the motion mask; determining a second set of pixels from one of the plurality of images that correspond to the region in the motion mask; and replacing the first set of pixels in the image associated with the first exposure with the second set of pixels.

In some aspects, one or more of the methods, apparatuses, and computer-readable medium described above further comprise: generating a motion mask from the plurality of images associated with at least the second exposure; determining a region in the motion mask corresponding to a first set of pixels at least in part by comparing the first set of pixels with the motion mask; determining a second set of pixels from one of the plurality of images that correspond to the region in the motion mask; and determining to apply the second set of pixels of the region in the motion mask into the HDR image at least in part by comparing a quality of the second set of pixels to pixels within the motion mask.

In some aspects, one or more of the methods, apparatuses, and computer-readable medium described above further comprise: determining a number of pixels in the second set of pixels having one or more luma values that are less than a noise threshold; and comparing the number of pixels that are less than the noise threshold to a number of the pixels within the motion mask, wherein the second set of pixels are applied into the HDR image when the number of pixels that are less than the noise threshold is less than the number of pixels within the motion mask.

According to at least one additional example, a method is provided for capturing one or more images. The method includes: capturing an image associated with a first exposure; capturing a plurality of images associated with at least a second exposure, the second exposure being less than the first exposure; generating a maximum brightness image from the plurality of images at least in part by merging the plurality of images based on a maximum saturation to fill in background information to reduce ghosting; detecting a first set of pixels in the maximum brightness image are located in a dark region; identifying contours in a motion mask and copying content corresponding to the first set of pixels from one image of the plurality of images into the image associated with the first exposure or an image; and generating an HDR image at least in part by merging the image associated with the first exposure, the maximum brightness image, and the copied content.

In another example, an apparatus for capturing one or more images is provided that includes at least one memory and at least one processor coupled to the at least one memory. The at least one processor is configured to: capture an image associated with a first exposure; capture a plurality of images associated with at least a second exposure, the second exposure being less than the first exposure; generate a maximum brightness image from the plurality of images at least in part by merging the plurality of images based on a maximum saturation to fill in background information to reduce ghosting; detect a first set of pixels in the maximum brightness image are located in a dark region; identify contours in a motion mask and copying content corresponding to the first set of pixels from one image of the plurality of images into the image associated with the first exposure or an image; and generate an HDR image at least in part by merging the image associated with the first exposure, the maximum brightness image, and the copied content.

In another example, a non-transitory computer-readable medium is provided that has stored thereon instructions that, when executed by one or more processors, cause the one or more processors to: capture an image associated with a first exposure; capture a plurality of images associated with at least a second exposure, the second exposure being less than the first exposure; generate a maximum brightness image from the plurality of images at least in part by merging the plurality of images based on a maximum saturation to fill in background information to reduce ghosting; detect a first set of pixels in the maximum brightness image are located in a dark region; identify contours in a motion mask and copy content corresponding to the first set of pixels from one image of the plurality of images into the image associated with the first exposure or an image; and generate an HDR image at least in part by merging the image associated with the first exposure, the maximum brightness image, and the copied content.

In another example, an apparatus for capturing one or more images is provided. The apparatus includes: means for capturing an image associated with a first exposure; means for capturing a plurality of images associated with at least a second exposure, the second exposure being less than the first exposure; means for generating a maximum brightness image from the plurality of images at least in part by merging the plurality of images based on a maximum saturation to fill in background information to reduce ghosting; means for detecting a first set of pixels in the maximum brightness image are located in a dark region; means for identifying contours in a motion mask and copying content corresponding to the first set of pixels from one image of the plurality of images into the image associated with the first exposure or an image; and means for generating an HDR image at least in part by merging the image associated with the first exposure, the maximum brightness image, and the copied content.

In some aspects, determining whether a number of noisy pixels associated with the content from an image associated with the plurality of images is less than a number of first pixels in the maximum brightness image, wherein the noisy pixels fill regions of the image associated with the first exposure when the number of noisy pixels is less than the number of the first pixels.

In some aspects, the apparatus is, is part of, and/or includes a wearable device, an extended reality (XR) device (e.g., a virtual reality (VR) device, an augmented reality (AR) device, or a mixed reality (MR) device), a head-mounted device (HMD) device, a wireless communication device, a mobile device (e.g., a mobile telephone and/or mobile handset and/or so-called "smart phone" or other mobile device), a camera, a personal computer, a laptop computer, a server computer, a vehicle or a computing device or component of a vehicle, another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyroscopes, one or more gyrometers, one or more accelerometers, any combination thereof, and/or other sensor).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following figures:

FIG. 1A, FIG. 1B, and FIG. 1C are diagrams illustrating example configurations for an image sensor of an image capture device, in accordance with aspects of the present disclosure.

DETAILED DESCRIPTION

Figure 1A:
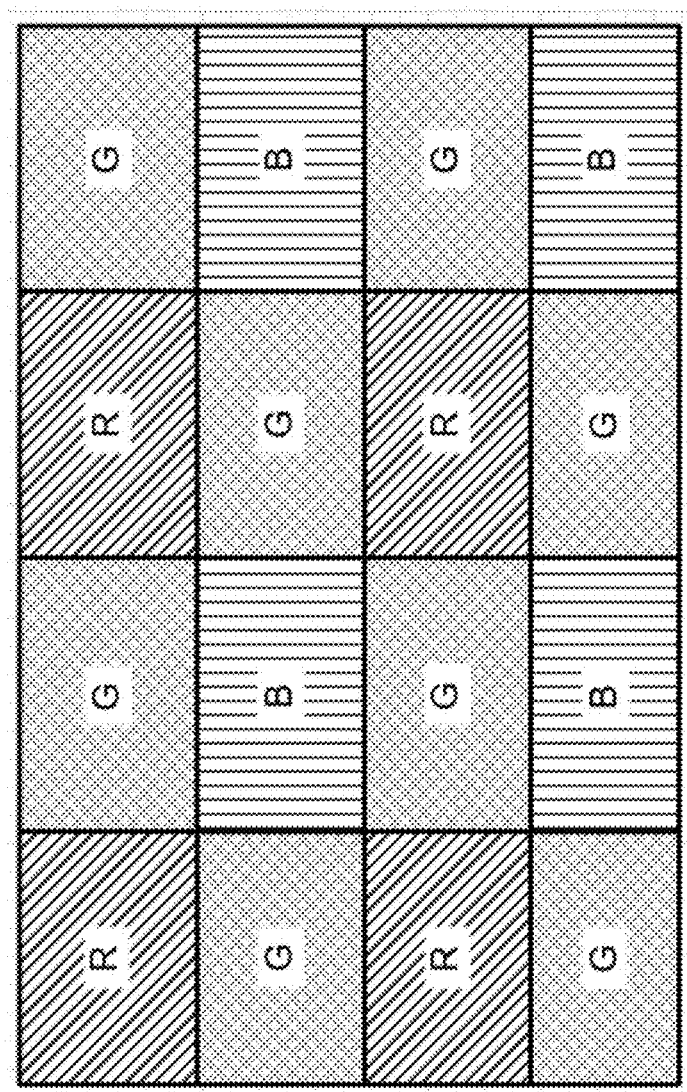

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

The ensuing description provides example aspects only, and is not intended to limit the scope, applicability, or configuration of the disclosure. Rather, the ensuing description of the exemplary aspects will provide those skilled in the art with an enabling description for implementing an aspect of the disclosure. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

A camera is a device that receives light and captures image frames, such as still images or video frames, using an image sensor. The terms "image," "image frame," and "frame" are used interchangeably herein. Cameras can be configured with a variety of image capture and image processing settings. The different settings result in images with different appearances. Some camera settings are determined and applied before or during capture of one or more image frames, such as ISO, exposure time, aperture size, f/stop, shutter speed, focus, and gain. For example, settings or parameters can be applied to an image sensor for capturing the one or more image frames. Other camera settings can configure post-processing of one or more image frames, such as alterations to contrast, brightness, saturation, sharpness, levels, curves, or colors. For example, settings or parameters can be applied to a processor (e.g., an image signal processor (ISP)) for processing the one or more image frames captured by the image sensor.

The dynamic range of a digital imaging device, such as a digital camera, is the ratio between the largest amount of light that the device can capture without light saturation, and the lowest amount of light the device can accurately measure and distinguish from intrinsic image noise (electrical noise, thermal noise, etc.). Traditionally, digital cameras are able to capture only a small portion of the natural illumination range of a real-world scene. For example, the dynamic range of a scene may be, 100,000:1, while the dynamic range of the image sensor of a digital camera may be, 100:1. When the dynamic range of the scene exceeds the dynamic range of the sensor, details in the regions of highest light levels and/or lowest light levels are lost.

An imaging device can generate a high dynamic range (HDR) image by merging multiple images that captured with different exposure settings. For instance, an imaging device can generate an HDR image by merging together a short-exposure image captured with a short exposure time, a medium-exposure image captured with a medium exposure time that is longer than the short exposure time, and a long-exposure image captured with a long exposure time that is longer than the medium exposure time. Because short-exposure images are generally dark, they generally preserve the most detail in the highlights (bright areas) of a photographed scene. Medium-exposure images and the long-exposure images are generally brighter than short-exposure images, and may be overexposed (e.g., too bright to make out details) in the highlight portions (bright areas) of the scene. Because long-exposure images generally include bright portions, they may preserve detail in the shadows (dark areas) of a photographed scene. Medium-exposure images and the short-exposure images are generally darker than long-exposure images, and may be under-exposed (e.g., too dark to make out details in) in the shadow portions (dark areas) of the scene, making their depictions of the shadows too dark to observe details. To generate an HDR image, the imaging device may, for example, use portions of the short-exposure image to depict highlights (bright areas) of the photographed scene, use portions of the long-exposure image depicting shadows (dark areas) of the scene, and use portions of the medium-exposure image depicting other areas (other than highlights and shadows) of a scene.

In some cases, an HDR image may be captured while a subject is moving and the process of synthesizing the images together into a single static image can produce visual artifacts. For example, a short exposure image can have a subject at a different location than a long exposure image and the process of selecting pixels and fusing together the pixels from the images can generate ghosting effects based on various factors such as background, foreground, and so forth. In particular, taking content from the long exposure image may result in ghosting in the HDR image (e.g., around the object's plane of movement) and taking content from the short exposure image may introduce noise in the HDR image.

In some aspects, systems, apparatuses, processes (also referred to as methods), and computer-readable media (collectively referred to herein as "systems and techniques") are described for generating an HDR image using a combined short exposure image. For instance, an imaging system can generate the combined brightness short exposure image by combining pixels from multiple short exposure images. In one illustrative example, the imaging system can generate a maximum brightness image by using the pixels from the short exposure images that have the brightest values. The combined short exposure image (e.g., the maximum brightness image) has sufficient background information to synthesize an HDR image without ghosting effects.

Additionally or alternatively, the imaging system may be configured to determine if there are certain low quality pixels (referred to herein as "bad pixels") associated with the maximum brightness short exposure image based on the image. In one aspect, movement of a bright object on a dark background with the maximum brightness short exposure image can generate a glowing effect based on the movement because pixels are not sufficiently filled in the background. The imaging system can identify the bad pixels and determine how to fill the bad pixels using either a long exposure image or a short exposure image. In some aspects, a machine learning (ML) model or a deep neural network (DNN) for deep learning can be configured to perform at least some of the aspects described herein, such as identification of bad pixels in the maximum brightness short exposure image or detecting motion across one or more images.

Fusion of the long and short exposure frames may be performed in-line (e.g., in real-time while each frame is captured), which is more power-efficient than performing the fusion once the full frame has been captured. However, the alignment may have to be programmed several frames in advance with such in-line operations. Certain aspects provide techniques for estimating a shift for the alignment of frames based on past samples. For example, a neural network may be used to estimate shifts for alignment in x and y dimensions (e.g., directions) based on previous samples for an in-line fusion. Once the shift is estimated for a particular frame in advance, the shift may be applied for alignment once the frame is captured. As used herein, a long exposure frame and a short exposure frame generally refer to any frames having different exposures where the long exposure frame has a longer exposure than the short exposure frame. Moreover, while some example provided herein describe techniques for fusing frames having different exposure times, the aspects of the present disclosure may be applied for fusing of frames having different exposure settings (e.g., fusion of a high exposure frame and a low exposure frame).

Image sensors include one or more arrays of photodiodes or other photosensitive elements. Each photodiode measures an amount of light that eventually corresponds to a particular pixel in the image produced by the image sensor. In some cases, different photodiodes may be covered by different color filters of a color filter array and may thus measure light matching the color of the color filter covering the photodiode.

Various color filter arrays can be used, including a Bayer color filter array, a quad color filter array (also referred to as a quad Bayer filter or QCFA), and/or other color filter array. An example of a Bayer color filter array 100 is shown in FIG. 1A. As shown, the Bayer color filter array 100 includes a repeating pattern of red color filters, blue color filters, and green color filters. As shown in FIG. 1B, a QCFA 110 includes a 2×2 (or "quad") pattern of color filters, including a 2×2 pattern of red (R) color filters, a pair of 2×2 patterns of green (G) color filters, and a 2×2 pattern of blue (B) color filters. The pattern of the QCFA 110 shown in FIG. 1B is repeated for the entire array of photodiodes of a given image sensor. Using either QCFA 110 or the Bayer color filter array 100, each pixel of an image is generated based on red light data from at least one photodiode covered in a red color filter of the color filter array, blue light data from at least one photodiode covered in a blue color filter of the color filter array, and green light data from at least one photodiode covered in a green color filter of the color filter array. Other types of color filter arrays may use yellow, magenta, and/or cyan (also referred to as "emerald") color filters instead of or in addition to red, blue, and/or green color filters. The different photodiodes throughout the pixel array can have different spectral sensitivity curves, therefore responding to different wavelengths of light. Monochrome image sensors may also lack color filters and therefore lack color depth.

In some cases, subgroups of multiple adjacent photodiodes (e.g., 2×2 patches of photodiodes when QCFA 110 shown in FIG. 1B is used) can measure the same color of light for approximately the same region of a scene. For example, when photodiodes included in each of the subgroups of photodiodes are in close physical proximity, the light incident on each photodiode of a subgroup can originate from approximately the same location in a scene (e.g., a portion of a leaf on a tree, a small section of sky, etc.).

In some examples, a brightness range of light from a scene may significantly exceed the brightness levels that the image sensor can capture. For example, a digital single-lens reflex (DSLR) camera may be able to capture a 1:30,000 contrast ratio of light from a scene while the brightness levels of an HDR scene can exceed a 1:1,000,000 contrast ratio.

In some cases, HDR sensors may be utilized to enhance the contrast ratio of an image captured by an image capture device. In some examples, HDR sensors may be used to obtain multiple exposures within one image or frame, where such multiple exposures can include short (e.g., 5 ms) and long (e.g., 15 or more ms) exposure times. As used herein, a long exposure time generally refers to any exposure time that longer than a short exposure time.

Figure 1C:
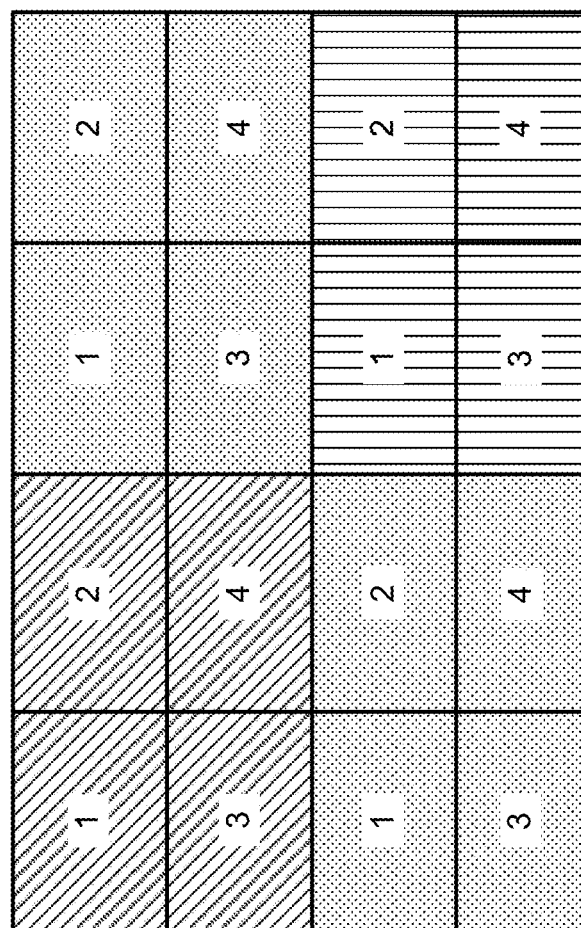

In some implementations, HDR sensors may be able to configure individual photodiodes within subgroups of photodiodes (e.g., the four individual R photodiodes, the four individual B photodiodes, and the four individual G photodiodes from each of the two 2×2 G patches in the QCFA 110 shown in FIG. 1B) to have different exposure settings. A collection of photodiodes with matching exposure settings is also referred to as photodiode exposure group herein. FIG. 1C illustrates a portion of an image sensor array with a QCFA filter that is configured with four different photodiode exposure groups 1 through 4. As shown in the example photodiode exposure group array 120 in FIG. 1C, each 2×2 patch can include a photodiode from each of the different photodiode exposure groups for a particular image sensor.

Although four groupings are shown in a specific grouping in FIG. 1C, a person of ordinary skill will recognize that different numbers of photodiode exposure groups, different arrangements of photodiode exposure groups within subgroups, and any combination thereof can be used without departing from the scope of the present disclosure.

As noted with respect to FIG. 1C, in some HDR image sensor implementations, exposure settings corresponding to different photodiode exposure groups can include different exposure times (also referred to as exposure lengths), such as short exposure, medium exposure, and long exposure. In some cases, different images of a scene associated with different exposure settings can be formed from the light captured by the photodiodes of each photodiode exposure group. For example, a first image can be formed from the light captured by photodiodes of photodiode exposure group 1, a second image can be formed from the photodiodes of photodiode exposure group 2, a third image can be formed from the light captured by photodiodes of photodiode exposure group 3, and a fourth image can be formed from the light captured by photodiodes of photodiode exposure group 4. Based on the differences in the exposure settings corresponding to each group, the brightness of objects in the scene captured by the image sensor can differ in each image. For example, well-illuminated objects captured by a photodiode with a long exposure setting may appear saturated (e.g., completely white). In some cases, an image processor can select between pixels of the images corresponding to different exposure settings to form a combined image.

In one illustrative example, the first image corresponds to a short exposure time (also referred to as a short exposure image), the second image corresponds to a medium exposure time (also referred to as a medium exposure image), and the third and fourth images correspond to a long exposure time (also referred to as long exposure images). In such an example, pixels of the combined image corresponding to portions of a scene that have low illumination (e.g., portions of a scene that are in a shadow) can be selected from a long exposure image (e.g., the third image or the fourth image). Similarly, pixels of the combined image corresponding to portions of a scene that have high illumination (e.g., portions of a scene that are in direct sunlight) can be selected from a short exposure image (e.g., the first image.

In some cases, an image sensor can also utilize photodiode exposure groups to capture objects in motion without blur. The length of the exposure time of a photodiode group can correspond to the distance that an object in a scene moves during the exposure time. If light from an object in motion is captured by photodiodes corresponding to multiple image pixels during the exposure time, the object in motion can appear to blur across the multiple image pixels (also referred to as motion blur). In some implementations, motion blur can be reduced by configuring one or more photodiode groups with short exposure times. In some implementations, an image capture device (e.g., a camera) can determine local amounts of motion (e.g., motion gradients) within a scene by comparing the locations of objects between two consecutively captured images. For example, motion can be detected in preview images captured by the image capture device to provide a preview function to a user on a display. In some cases, a machine learning model can be trained to detect localized motion between consecutive images.

Figure 2:
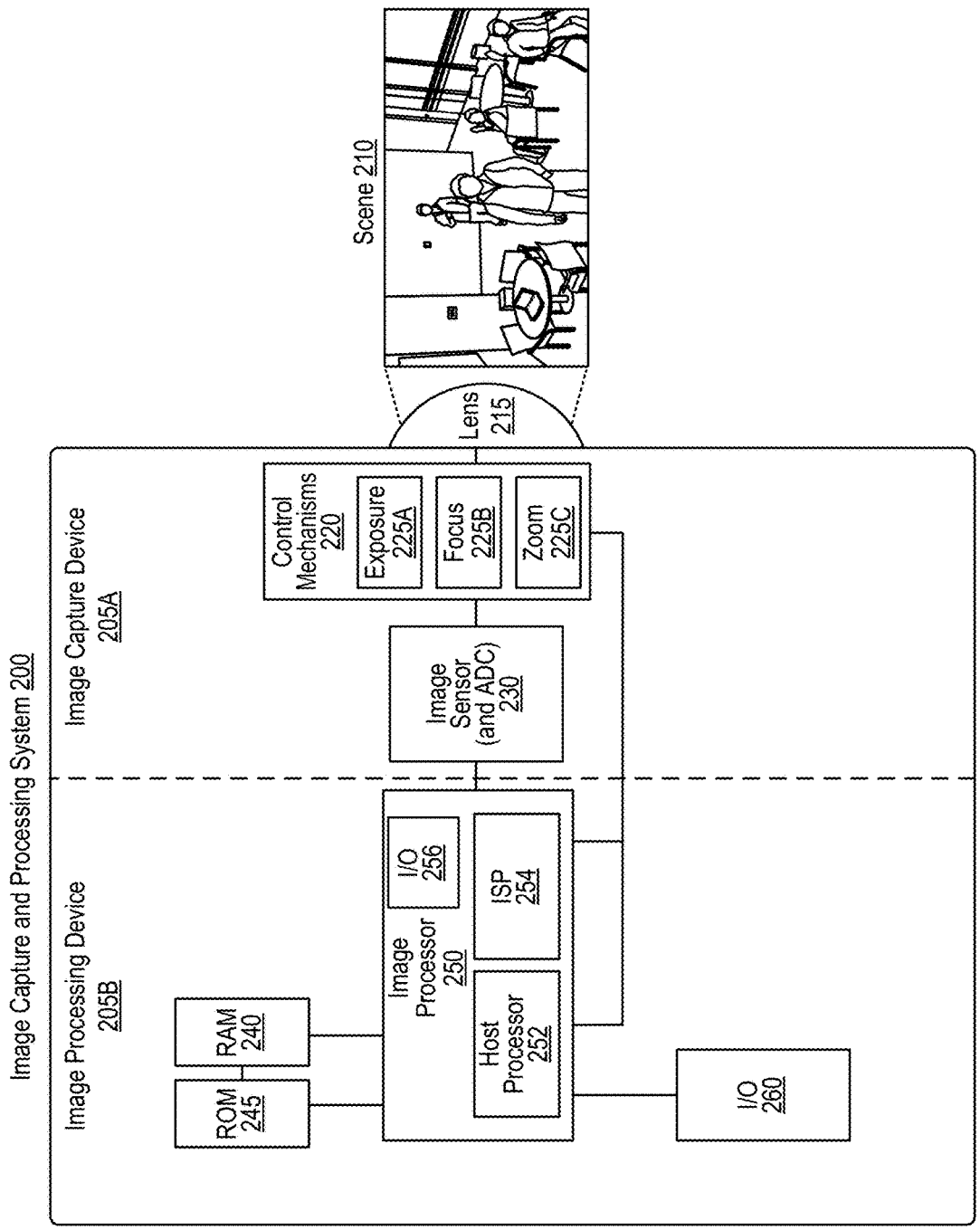
FIG. 2 is a block diagram illustrating an architecture of an image capture and processing device, in accordance with aspects of the present disclosure.

Various aspects of the techniques described herein will be discussed below with respect to the figures. FIG. 2 is a block diagram illustrating an architecture of an image capture and processing system 200. The image capture and processing system 200 includes various components that are used to capture and process images of scenes (e.g., an image of a scene 210). The image capture and processing system 200 can capture standalone images (or photographs) and/or can capture videos that include multiple images (or video frames) in a particular sequence. In some cases, the lens 215 and image sensor 230 can be associated with an optical axis. In one illustrative example, the photosensitive area of the image sensor 230 (e.g., the photodiodes) and the lens 215 can both be centered on the optical axis. A lens 215 of the image capture and processing system 200 faces a scene 210 and receives light from the scene 210. The lens 215 bends incoming light from the scene toward the image sensor 230. The light received by the lens 215 passes through an aperture. In some cases, the aperture (e.g., the aperture size) is controlled by one or more control mechanisms 220 and is received by an image sensor 230. In some cases, the aperture can have a fixed size.

The one or more control mechanisms 220 may control exposure, focus, and/or zoom based on information from the image sensor 230 and/or based on information from the image processor 250. The one or more control mechanisms 220 may include multiple mechanisms and components; for instance, the control mechanisms 220 may include one or more exposure control mechanisms 225A, one or more focus control mechanisms 225B, and/or one or more zoom control mechanisms 225C. The one or more control mechanisms 220 may also include additional control mechanisms besides those that are illustrated, such as control mechanisms controlling analog gain, flash, HDR, depth of field, and/or other image capture properties.

The focus control mechanism 225B of the control mechanisms 220 can obtain a focus setting. In some examples, focus control mechanism 225B store the focus setting in a memory register. Based on the focus setting, the focus control mechanism 225B can adjust the position of the lens 215 relative to the position of the image sensor 230. For example, based on the focus setting, the focus control mechanism 225B can move the lens 215 closer to the image sensor 230 or farther from the image sensor 230 by actuating a motor or servo (or other lens mechanism), thereby adjusting focus. In some cases, additional lenses may be included in the image capture and processing system 200, such as one or more microlenses over each photodiode of the image sensor 230, which each bend the light received from the lens 215 toward the corresponding photodiode before the light reaches the photodiode. The focus setting may be determined via contrast detection autofocus (CDAF), phase detection autofocus (PDAF), hybrid autofocus (HAF), or some combination thereof. The focus setting may be determined using the control mechanism 220, the image sensor 230, and/or the image processor 250. The focus setting may be referred to as an image capture setting and/or an image processing setting. In some cases, the lens 215 can be fixed relative to the image sensor and focus control mechanism 225B can be omitted without departing from the scope of the present disclosure.

The exposure control mechanism 225A of the control mechanisms 220 can obtain an exposure setting. In some cases, the exposure control mechanism 225A stores the exposure setting in a memory register. Based on this exposure setting, the exposure control mechanism 225A can control a size of the aperture (e.g., aperture size or f/stop), a duration of time for which the aperture is open (e.g., exposure time or shutter speed), a duration of time for which the sensor collects light (e.g., exposure time or electronic shutter speed), a sensitivity of the image sensor 230 (e.g., ISO speed or film speed), analog gain applied by the image sensor 230, or any combination thereof. The exposure setting may be referred to as an image capture setting and/or an image processing setting.

The zoom control mechanism 225C of the control mechanisms 220 can obtain a zoom setting. In some examples, the zoom control mechanism 225C stores the zoom setting in a memory register. Based on the zoom setting, the zoom control mechanism 225C can control a focal length of an assembly of lens elements (lens assembly) that includes the lens 215 and one or more additional lenses. For example, the zoom control mechanism 225C can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 215 in some cases) that receives the light from the scene 210 first, with the light then passing through an afocal zoom system between the focusing lens (e.g., lens 215) and the image sensor 230 before the light reaches the image sensor 230. The afocal zoom system may, in some cases, include two positive (e.g., converging, convex) lenses of equal or similar focal length (e.g., within a threshold difference of one another) with a negative (e.g., diverging, concave) lens between them. In some cases, the zoom control mechanism 225C moves one or more of the lenses in the afocal zoom system, such as the negative lens and one or both of the positive lenses. In some cases, zoom control mechanism 225C can control the zoom by capturing an image from an image sensor of a plurality of image sensors (e.g., including image sensor 230) with a zoom corresponding to the zoom setting. For example, image processing system 200 can include a wide angle image sensor with a relatively low zoom and a telephoto image sensor with a greater zoom. In some cases, based on the selected zoom setting, the zoom control mechanism 225C can capture images from a corresponding sensor.

The image sensor 230 includes one or more arrays of photodiodes or other photosensitive elements. Each photodiode measures an amount of light that eventually corresponds to a particular pixel in the image produced by the image sensor 230. In some cases, different photodiodes may be covered by different filters. In some cases, different photodiodes can be covered in color filters, and may thus measure light matching the color of the filter covering the photodiode. Various color filter arrays can be used, including a Bayer color filter array (as shown in FIG. 1A), a QCFA (see FIG. 1B), and/or any other color filter array.

Returning to FIG. 1A and FIG. 1B, other types of color filters may use yellow, magenta, and/or cyan (also referred to as "emerald") color filters instead of or in addition to red, blue, and/or green color filters. In some cases, some photodiodes may be configured to measure infrared (IR) light. In some implementations, photodiodes measuring IR light may not be covered by any filter, thus allowing IR photodiodes to measure both visible (e.g., color) and IR light. In some examples, IR photodiodes may be covered by an IR filter, allowing IR light to pass through and blocking light from other parts of the frequency spectrum (e.g., visible light, color). Some image sensors (e.g., image sensor 230) may lack filters (e.g., color, IR, or any other part of the light spectrum) altogether and may instead use different photodiodes throughout the pixel array (in some cases vertically stacked). The different photodiodes throughout the pixel array can have different spectral sensitivity curves, therefore responding to different wavelengths of light. Monochrome image sensors may also lack filters and therefore lack color depth.

In some cases, the image sensor 230 may alternately or additionally include opaque and/or reflective masks that block light from reaching certain photodiodes, or portions of certain photodiodes, at certain times and/or from certain angles. In some cases, opaque and/or reflective masks may be used for PDAF. In some cases, the opaque and/or reflective masks may be used to block portions of the electromagnetic spectrum from reaching the photodiodes of the image sensor (e.g., an IR cut filter, an ultraviolet (UV) cut filter, a band-pass filter, low-pass filter, high-pass filter, or the like). The image sensor 230 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 220 may be included instead or additionally in the image sensor 230. The image sensor 230 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

Figure 18:
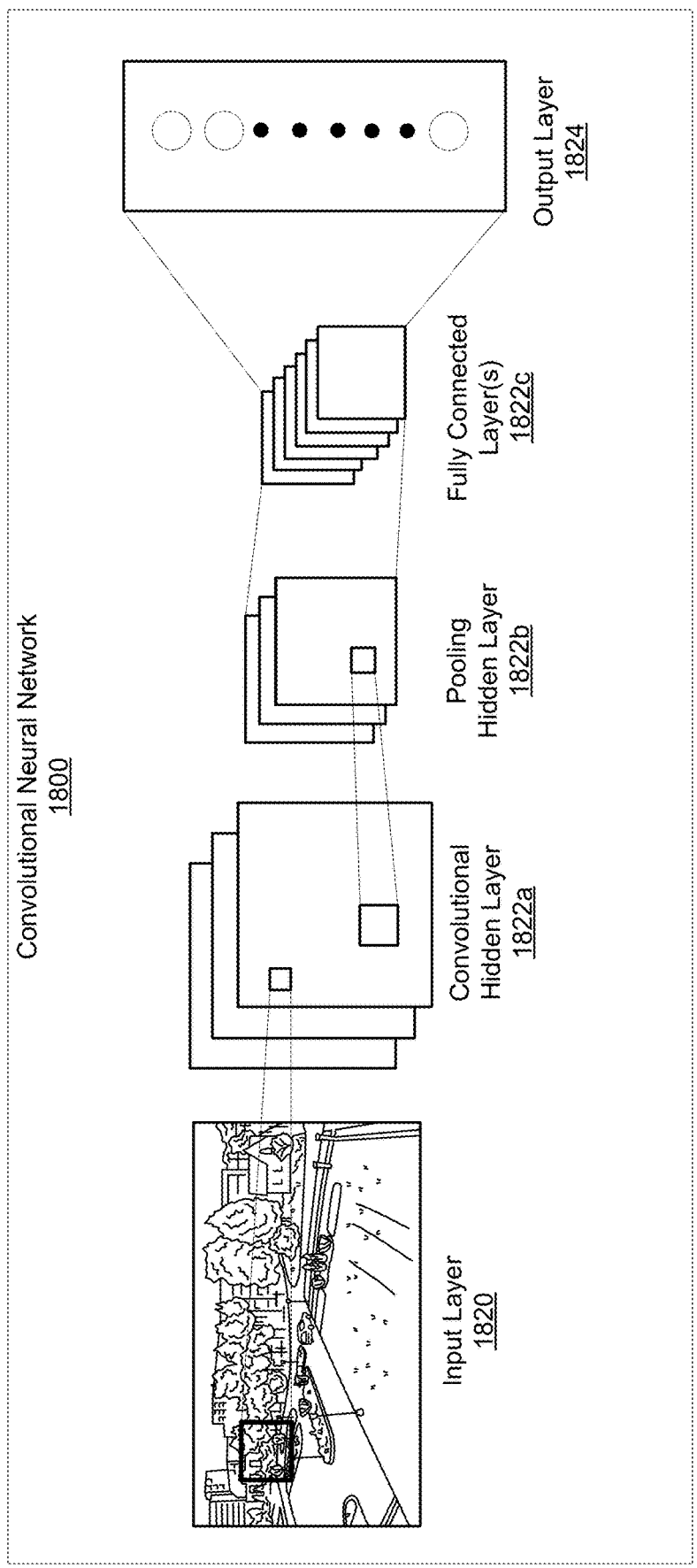
FIG. 18 is an illustrative example of a convolutional neural network (CNN), in accordance with aspects of the present disclosure.

The image processor 250 may include one or more processors, such as one or more ISPs (e.g., ISP 254), one or more host processors (e.g., host processor 252), and/or one or more of any other type of processor 1910 discussed with respect to the computing system 1900 of FIG. 18. The host processor 252 can be a digital signal processor (DSP) and/or other type of processor. In some implementations, the image processor 250 is a single integrated circuit or chip (e.g., referred to as a system-on-chip or SoC) that includes the host processor 252 and the ISP 254. In some cases, the chip can also include one or more input/output ports (e.g., input/output (I/O) ports 256), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 256 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 252 can communicate with the image sensor 230 using an I2C port, and the ISP 254 can communicate with the image sensor 230 using an MIPI port.

The image processor 250 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 250 may store image frames and/or processed images in random access memory (RAM) 240/925, read-only memory (ROM) 245/920, a cache, a memory unit, another storage device, or some combination thereof.

Various input/output (I/O) devices 260 may be connected to the image processor 250. The I/O devices 260 can include a display screen, a keyboard, a keypad, a touchscreen, a trackpad, a touch-sensitive surface, a printer, any other output devices 1935, any other input devices 1945, or some combination thereof. In some cases, a caption may be input into the image processing device 205B through a physical keyboard or keypad of the I/O devices 260, or through a virtual keyboard or keypad of a touchscreen of the I/O devices 260. The I/O 260 may include one or more ports, jacks, or other connectors that enable a wired connection between the image capture and processing system 200 and one or more peripheral devices, over which the image capture and processing system 200 may receive data from the one or more peripheral device and/or transmit data to the one or more peripheral devices. The I/O 260 may include one or more wireless transceivers that enable a wireless connection between the image capture and processing system 200 and one or more peripheral devices, over which the image capture and processing system 200 may receive data from the one or more peripheral device and/or transmit data to the one or more peripheral devices. The peripheral devices may include any of the previously-discussed types of I/O devices 260 and may themselves be considered I/O devices 260 once they are coupled to the ports, jacks, wireless transceivers, or other wired and/or wireless connectors.

In some cases, the image capture and processing system 200 may be a single device. In some cases, the image capture and processing system 200 may be two or more separate devices, including an image capture device 205A (e.g., a camera) and an image processing device 205B (e.g., a computing device coupled to the camera). In some implementations, the image capture device 205A and the image processing device 205B may be coupled together, for example via one or more wires, cables, or other electrical connectors, and/or wirelessly via one or more wireless transceivers. In some implementations, the image capture device 205A and the image processing device 205B may be disconnected from one another.

As shown in FIG. 2, a vertical dashed line divides the image capture and processing system 200 of FIG. 2 into two portions that represent the image capture device 205A and the image processing device 205B, respectively. The image capture device 205A includes the lens 215, control mechanisms 220, and the image sensor 230. The image processing device 205B includes the image processor 250 (including the ISP 254 and the host processor 252), the RAM 240, the ROM 245, and the I/O 260. In some cases, certain components illustrated in the image capture device 205A, such as the ISP 254 and/or the host processor 252, may be included in the image capture device 205A.

The image capture and processing system 200 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 200 can include one or more wireless transceivers for wireless communications, such as cellular network communications, 802.11 wi-fi communications, wireless local area network (WLAN) communications, or some combination thereof. In some implementations, the image capture device 205A and the image processing device 205B can be different devices. For instance, the image capture device 205A can include a camera device and the image processing device 205B can include a computing device, such as a mobile handset, a desktop computer, or other computing device.

While the image capture and processing system 200 is shown to include certain components, one of ordinary skill will appreciate that the image capture and processing system 200 can include more components than those shown in FIG. 2. The components of the image capture and processing system 200 can include software, hardware, or one or more combinations of software and hardware. For example, in some implementations, the components of the image capture and processing system 200 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 200.

Figure 3:
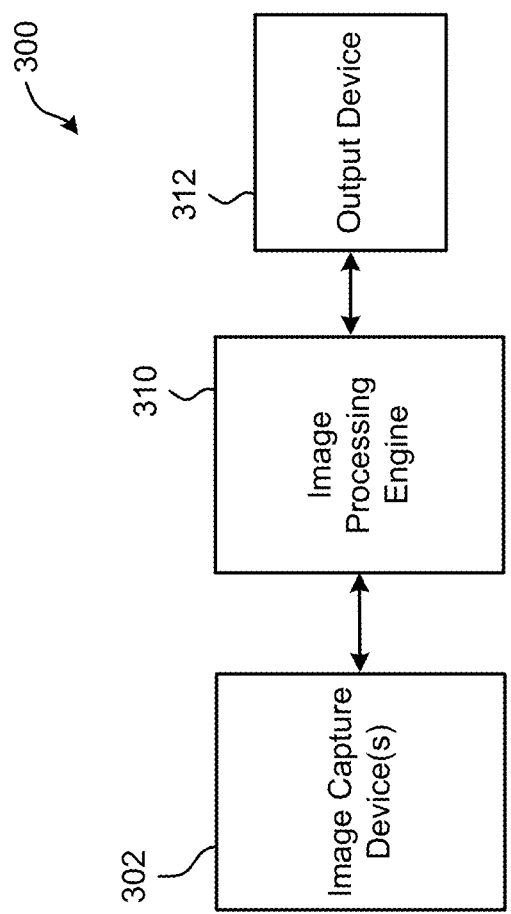
FIG. 3 is a block diagram illustrating an example of an image capture system, in accordance with aspects of the present disclosure.

FIG. 3 is a block diagram illustrating an example of an image capture system 300. The image capture system 300 includes various components that are used to process input images or frames to produce an output image or frame. As shown, the components of the image capture system 300 include one or more image capture devices 302, an image processing engine 310, and an output device 312. The image processing engine 310 can produce high dynamic range depictions of a scene, as described in more detail herein.

The image capture system 300 can include or be part of an electronic device or system. For example, the image capture system 300 can include or be part of an electronic device or system, such as a mobile or stationary telephone handset (e.g., smartphone, cellular telephone, or the like), an extended reality (XR) device (e.g., a virtual reality (VR) device, an augmented reality (AR) device, or a mixed reality (MR) device), a vehicle or computing device/system of a vehicle, a server computer (e.g., in communication with another device or system, such as a mobile device, an XR system/device, a vehicle computing system/device, etc.), a desktop computer, a laptop or notebook computer, a tablet computer, a set-top box, a television, a camera device, a display device, a digital media player, a video streaming device, or any other suitable electronic device. In some examples, the image capture system 300 can include one or more wireless transceivers (or separate wireless receivers and transmitters) for wireless communications, such as cellular network communications, 802.11 Wi-Fi communications, WLAN communications, Bluetooth or other short-range communications, any combination thereof, and/or other communications. In some implementations, the components of the image capture system 300 can be part of the same computing device. In some implementations, the components of the image capture system 300 can be part of two or more separate computing devices.

While the image capture system 300 is shown to include certain components, one of ordinary skill will appreciate that image capture system 300 can include more components or fewer components than those shown in FIG. 3. In some cases, additional components of the image capture system 300 can include software, hardware, or one or more combinations of software and hardware. For example, in some cases, the image capture system 300 can include one or more other sensors (e.g., one or more inertial measurement units (IMUs), radars, light detection and ranging (LIDAR) sensors, audio sensors, etc.), one or more display devices, one or more other processing engines, one or more other hardware components, and/or one or more other software and/or hardware components that are not shown in FIG. 3. In some implementations, additional components of the image capture system 300 can include and/or can be implemented using electronic circuits or other electronic hardware, which can include one or more programmable electronic circuits (e.g., DSPs, microprocessors, microcontrollers, GPUs, central processing units (CPUs), any combination thereof, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture system 300.

The one or more image capture devices 302 can capture image data and generate images (or frames) based on the image data and/or can provide the image data to the image processing engine 310 for further processing. The one or more image capture devices 302 can also provide the image data to the output device 312 for output (e.g., on a display). In some cases, the output device 312 can also include storage. An image or frame can include a pixel array representing a scene. For example, an image can be a red-green-blue (RGB) image having red, green, and blue color components per pixel; a luma, chroma-red, chroma-blue (YCbCr) image having a luma component and two chroma (color) components (chroma-red and chroma-blue) per pixel; or any other suitable type of color or monochrome image. In addition to image data, the image capture devices can also generate supplemental information such as the amount of time between successively captured images, timestamps of image capture, or the like.

Figure 4:
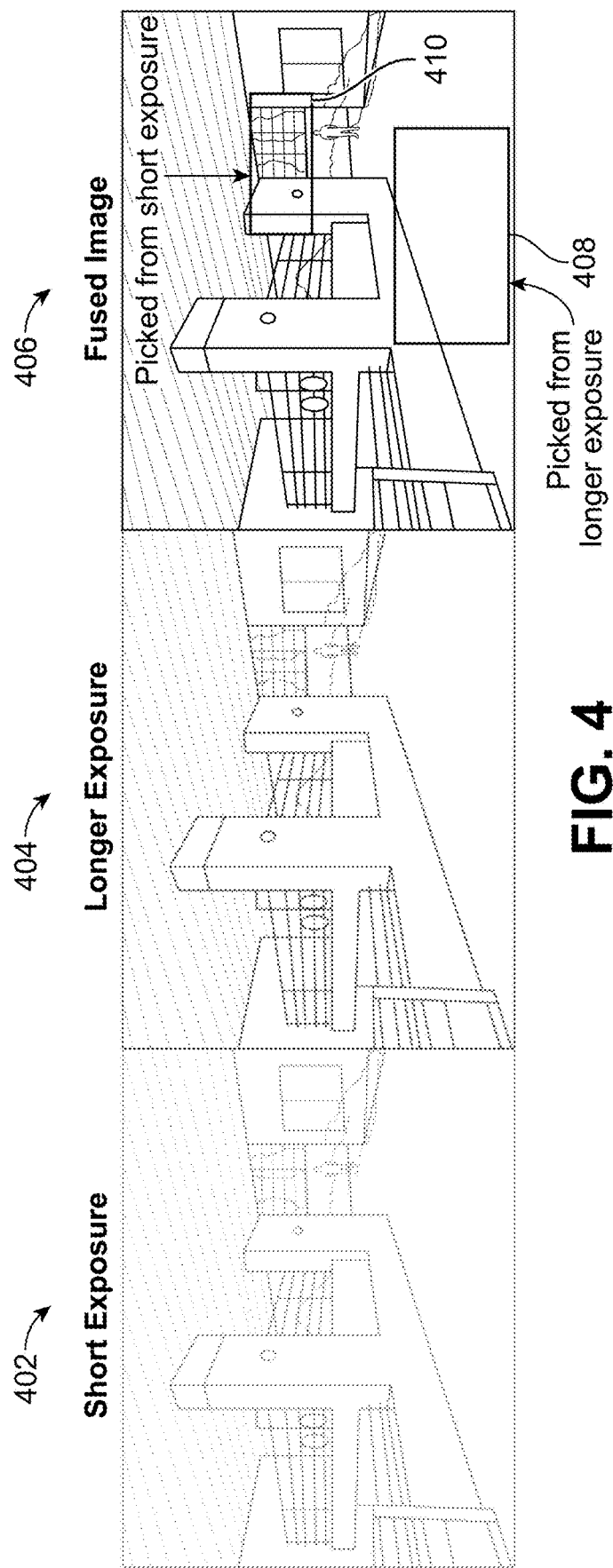
FIG. 4 is a diagram illustrating generation of a fused frame from short and long exposure frames, in accordance with aspects of the present disclosure.

FIG. 4 illustrates techniques for generating a fused frame from short and long exposure frames. As shown, a short exposure frame 402 and a long exposure frame 404 may be taken, which may be fused to provide a fused frame output 406 (e.g., an HDR frame output). Due to a bit depth of an image capture sensor, some pixels of a capture frame may be oversaturated, resulting in the image not showing some textures of a scene as shown in the short exposure frame 402. Thus, to generate an HDR frame, both short and long exposure frames may be captured, which may be fused (e.g., combined) to generate an HDR output frame. A fusion of short and long exposure frames may be performed to generate a fused output frame that includes parts of the short exposure frame and parts of the long exposure frame. For example, region 408 of the fused frame output 406 may be from the long exposure frame 404, while region 410 of the fused frame output 406 may be from the short exposure frame 402. However, fusing short and long exposure frames may result in irregularities due to global motion (e.g., motion of the image capture device). For example, from the time when the long exposure frame is captured to the time when the short exposure frame is captured, the image capture device or objects in a scene may have moved, causing irregularities if steps are not taken to align the short and long exposure frames prior to fusing the frames together. This global motion issue may also arise due to a rolling shutter, as described in more detail herein.

Figure 5:
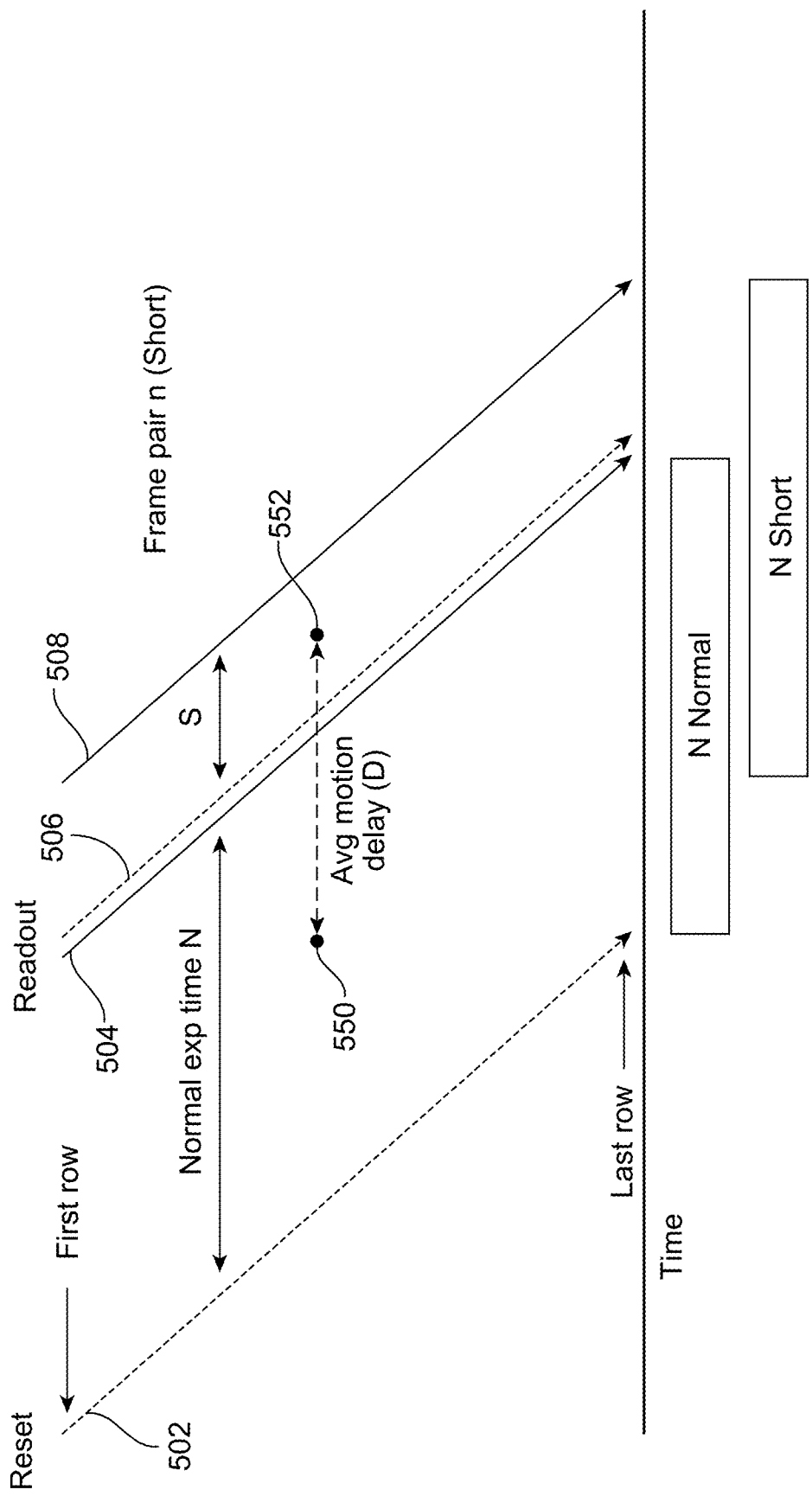
FIG. 5 is a diagram illustrating long exposure and short exposure streams from an image sensor, in accordance with certain of the present disclosure.

FIG. 5 is a diagram illustrating long exposure and short exposure streams (e.g., MIPI stream) from an image sensor (e.g., image sensor 230) to an imaging front end for processing. Line 502 represents the start of long exposure sensing (also referred to herein as normal exposure sensing), and line 504 represents the end of the long exposure sensing. The long exposure sensing starts from the first row of a sensor (e.g., image sensor 230 of FIG. 2) to the last row of the sensor, as shown. For each row (e.g., row of photodiodes), once the long exposure sensing has completed, short exposure sensing begins while the long exposure sensing continues to the next row. For example, line 506 represents the beginning of the short exposure sensing, and line 508 represents the end of the short exposure sensing, starting from the first row to the last row of the image sensor. The long exposure sensing (e.g., having a duration labeled "N Normal" in FIG. 5) may begin prior to the short exposure sensing (e.g., having a duration labeled "N short" in FIG. 5).

Once the long exposure sensing for a particular row is completed, a short delay (e.g., associated with the gap between lines 504, 506) occurs before the short exposure sensing begins. Once the short exposure sensing has finished for a particular row, the information for the row is read out from the image sensor for processing. Due to the gap from the long exposure sensing to the short exposure sensing (e.g., shown as an average motion delay (D) in FIG. 5), an opportunity exists for a user who is holding the camera to move and/or for objects in a scene being captured to move, resulting in a misalignment of features in the short and long exposure frames (e.g., features that are common or the same in the short and long exposure frames). For example, a motion delay (D) may exist from time 550 (e.g., time when half of the long exposure data is captured) and time 552 (e.g., the time when half of the short exposure data is captured). The motion delay (D) may be estimated as being the average motion delay associated with different long and short frame capture events (e.g., different HDR frame captures).

Because the sensing occurs one row at a time (e.g., starting from the first row to the last row), a rolling shutter global motion also occurs. The camera or objects in scene may move from when the data for a first row of sensors are captured to when the data for a last row of sensors are captured.

Figure 6:
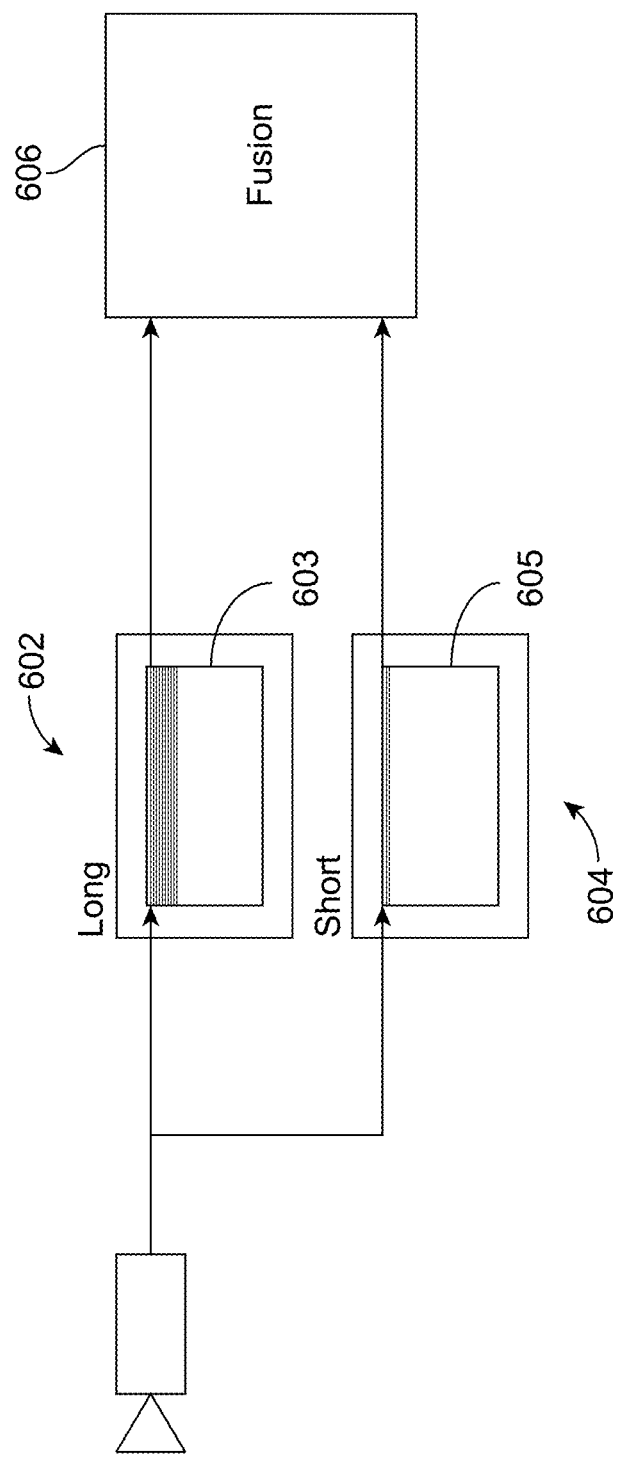
FIG. 6 is a diagram illustrating an example of in-line fusion of one or more short exposure frames and one or more long exposure frames, in accordance with aspects of the present disclosure.

FIG. 6 is a diagram illustrating techniques for an in-line fusion of one or more short exposure frames 604 and one or more long exposure frames 602. A fusion engine 606 can fuse the one or more short exposure frames 604 and the one or more long exposure frames 602 to generate an HDR frame. As described with respect to FIG. 5, long exposure data corresponding to the one or more long exposure frames 602 may be captured for each row prior to the short exposure data corresponding to the one or more short exposure frames 604. Therefore, the data from each row for the one or more long exposure frames 602 may be received and stored in a buffer 603 prior to the data for each row for the one or more short exposure frames 604 being stored in a buffer 605. As shown, the accumulation of data for the one or more long exposure frames 602 may be ahead of the accumulation of data for the one or more short exposure frames 604 (e.g., since the long exposure capture occurs prior to the short exposure capture as shown in FIG. 5).

In some cases, fusion by the fusion engine 606 may begin once a particular number of sensor rows or lines (e.g., the first 3 rows/lines, the first 4 rows/lines, the first 8 rows/lines, or other number of rows/lines) of the short frame data corresponding to the one or more short exposure frames 604 are accumulated. For example, upon receiving the short frame data for the particular number of sensor rows, operation for frame alignment may begin (e.g., instead of waiting for the entire frame to be received). However, various constraints may exist when performing frame alignment. For example, it may not be possible to fully warp a long exposure frame (from one or more long exposure frames 602) to align with a short exposure frame (from the one or more short exposure frames 604). Moreover, due to hardware timing constraints, the programming of alignment may have to be performed two or three frames in advance. In some aspects, a large buffer may be established for capturing frame data. Image data from the image sensor may be written at the center part of the image buffer, enabling the application of shifts in x and y dimensions to the data stored in the buffer for alignment. Moreover, certain aspects of the present disclosure provide techniques for alignment prediction to allow for the programming of alignment operations in advance.

Figure 7A:
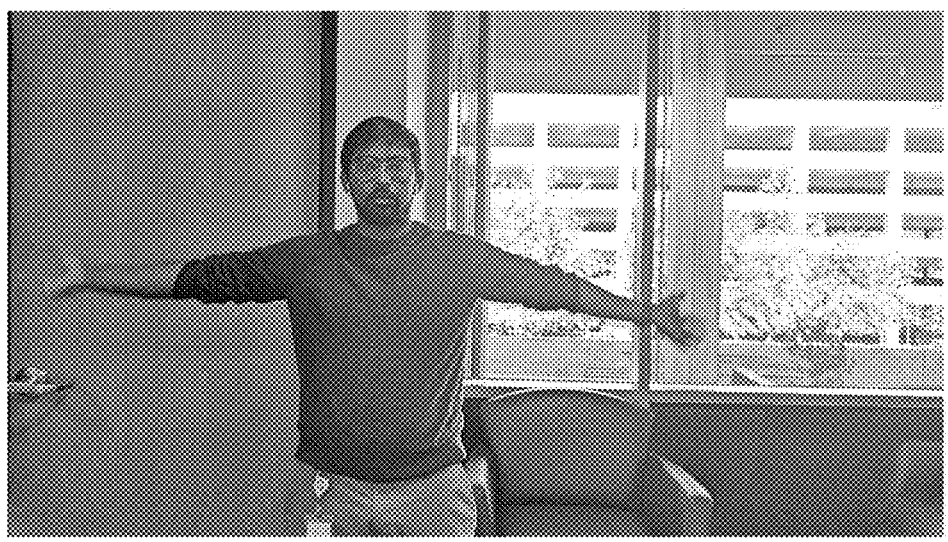
FIGS. 7A-7C illustrates an example high dynamic range (HDR) image generating by an HDR fusion system that includes ghosting based on movement in the HDR image, in accordance with certain of the present disclosure.
Figure 7B:
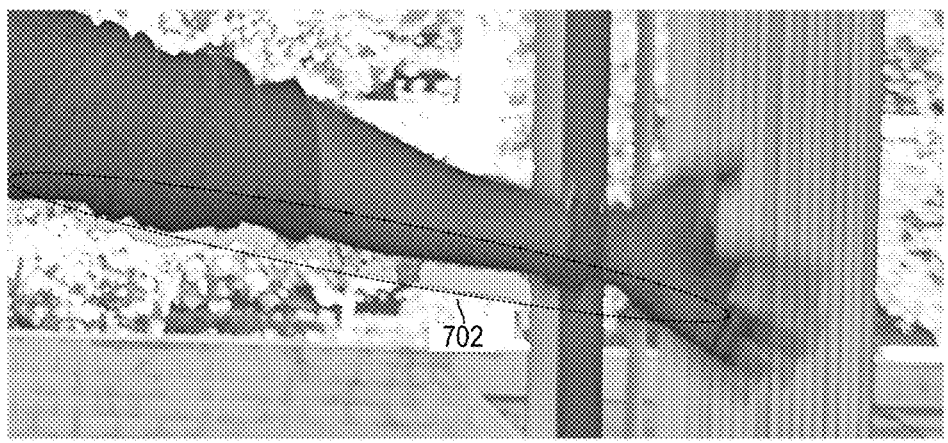
Figure 7C:
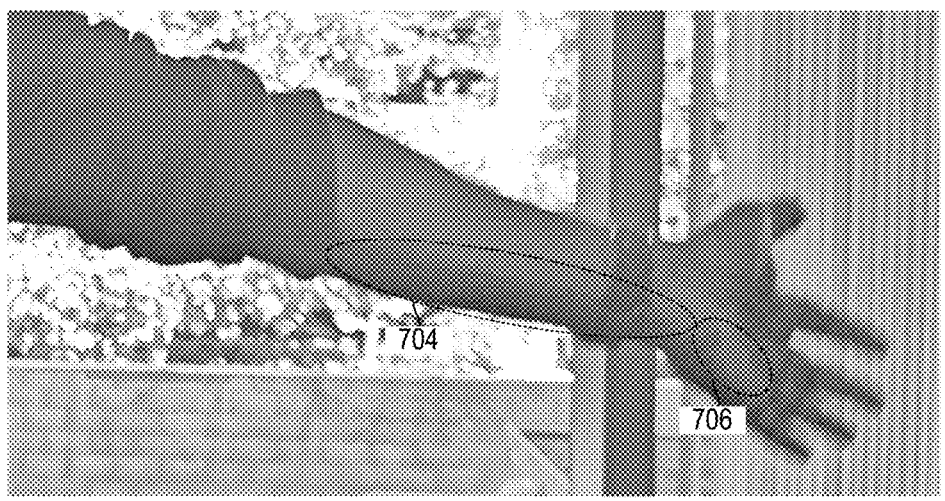

FIGS. 7A-7C are diagrams illustrating an example HDR image (also referred to as an HDR frame) generated by an HDR fusion system. As shown, the HDR image includes ghosting (in ghosting region 702) based on movement in the HDR image. In particular, FIG. 7A illustrates an example of a subject person who is moving their arms up and down while the HDR image is being captured. Because multiple images are captured and then synthesized into a single HDR image, the person's arms are at different locations at different times as the images are captured.

FIG. 7B illustrates a zoomed-in view of the HDR image of FIG. 7A, which more clearly illustrates the ghosting region 702 based on the movement of the arms upward. In this illustrative example, the long exposure image will capture the arm at a later position as compared to the short exposure image to generate the ghosting region 702. In some aspects, if the short and long exposure images have a moving region, the HDR fusion system can either take content from the long exposure image or the short exposure image. For example, the arm in FIG. 7A is moving vertically and the HDR fusion system takes an arm region from the long exposure image. Because the background outside the arm region is saturated in the long exposure image, the resulting HDR image is missing information. As a result, as illustrated in FIG. 7B, the ghosting region 702 around the moving arm region is gray because there is no information in the long exposure image for the ghosting region. The short exposure image contains information for the ghosting region. Synthesizing the long exposure image with the short exposure image results in generation of the ghosting region 702. For example, if the long exposure image is saturated, the HDR fusion system may take content from the short exposure image illustrated in FIG. 7C. However, the region in FIG. 7C that corresponds to the ghosting region 702 in FIG. 7A is the person's arm, which is a darker region. Taking the pixels from the person's arm will further increase the darkness. In some aspects, the HDR fusion system checks if the short exposure image for this particular region is darker than the long exposure image and determines to take pixels from the long exposure image because the short exposure image is darker.

In some other aspects, if the HDR fusion system uses content (e.g., pixels) from the short exposure image, the HDR fusion system may also introduce artifacts from the short exposure image in the resulting HDR image. For example, as illustrated in FIG. 7C, a first region 704 and second region 706 are noisy based on the short exposure time associated with the short exposure image. In particular, the first region 704 of the person's arm has visual defects and more discontinuous pixels compared to the arm region in FIG. 7B.

Figure 8:
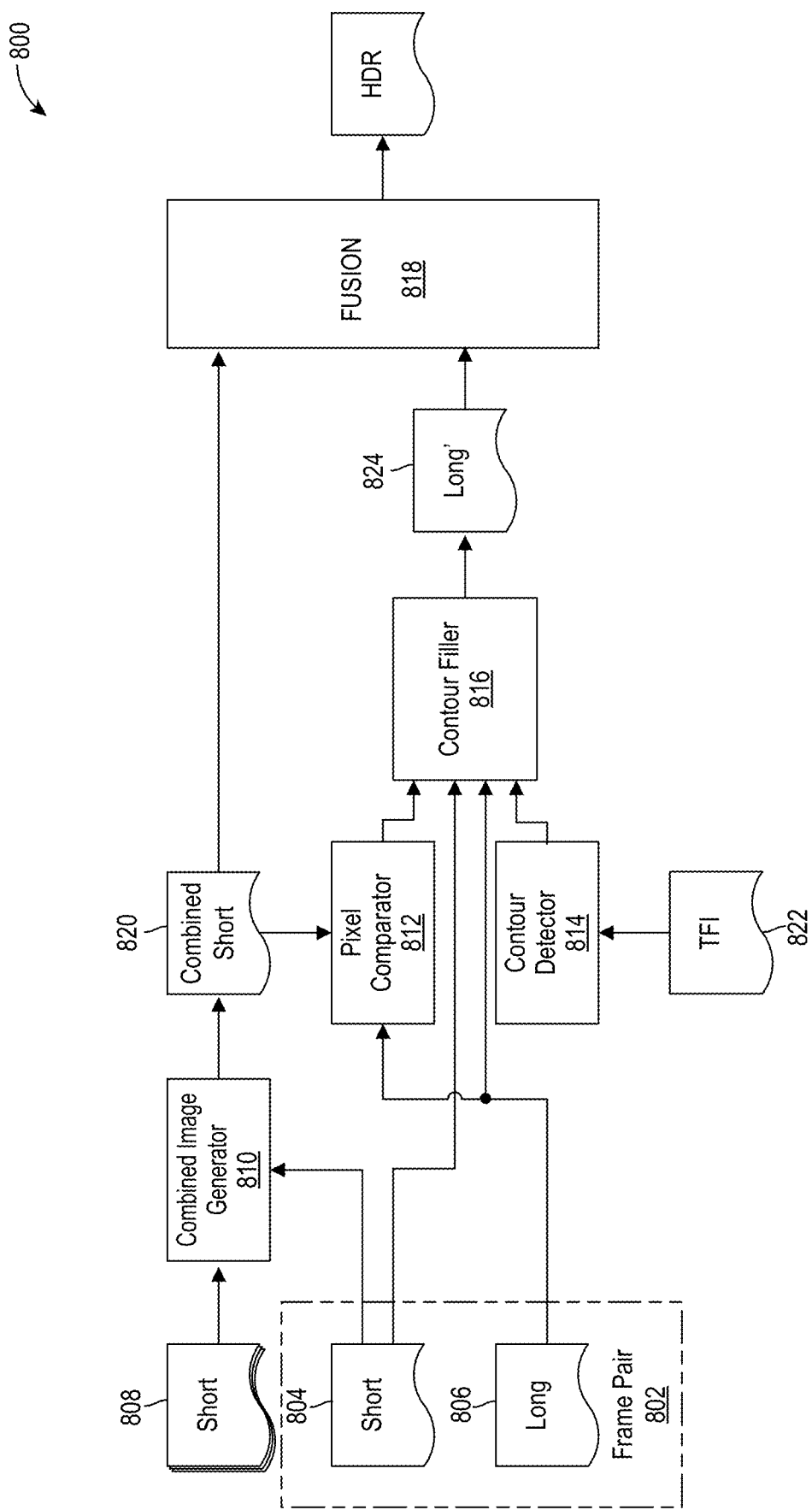
FIG. 8 illustrates an example image processing system for synthesizing an HDR image using a background fill technique to reduce ghosting, in accordance with certain of the present disclosure.

FIG. 8 is a diagram illustrating an example image processing system 800 for synthesizing an HDR image using a background fill technique to reduce ghosting. As shown, a frame pair 802 includes a short exposure image 804 and a long exposure image 806. The frame pair 802 may be provided to the image processing system 800 for processing. An exposure time used for the long exposure image 806 has an exposure time that is longer than an exposure time used for the short exposure image. At least one additional short exposure image 808 is also input into a combined image generator 810 along with the short exposure image 804.

The combined image generator 810 is configured to generate a combined short exposure image 820. In one illustrative example, the combined image generator can include a maximum luminance synthesizer that can generate a maximum short exposure image (as an example of the combined short exposure image 820). For instance, the combined image generator 810 may select a maximum brightness parameter, such as a luma (or luminance) component from the input images (e.g., the short exposure image 804 and the at least one additional short exposure image 808). The combined image generator 810 may then use (e.g., copy) the brightest regions (e.g., pixels or groups of pixels) of the different short exposure images into the combined short exposure image 820 (e.g., a maximum brightness short exposure image). In one example using two short exposure images for illustrative purposes, the combined image generator 810 can analyze each pixel of the two short exposure images to determine a brightest pixel (e.g., with a highest luma value) at each pixel position within the two short exposure images. For instance, for a pixel at position (0, 0) (corresponding to the to-left most pixel) in the two short exposure images, the combined image generator 810 may select the pixel from the respective short exposure image with the highest luminance value. The combined image generator 810 can perform similar analysis to select the brightest pixel at each pixel position in the two short exposure images, and may then use the selected pixels for the combined short exposure image 820 (as a maximum brightness short exposure image). According to some aspects, luma is the weighted sum of gamma-compressed RGB components of a color video. In some examples, a relative luminance, which is formed as a weighted sum of linear RGB components, may be used as the brightness parameter.

As noted above, in some aspects, the combined image generator 810 may identify each region (e.g., each pixel) from the short exposure images that has a maximum brightness value, such as luma or relative luminance. Table 1, which follows with an explanation, provides an illustrative example of code that uses lambda expressions to identify a maximum luma of each region (e.g., each pixel of the images), and copy that pixel into a maximum brightness short exposure image (as an example of the combined short exposure image 820).

TABLE 1

```
List<Image> = new List(short804, shorts808);
//Generate new image with same dimensions as short804
var maxShort = new Image( )
{
  Dimensions = short804.Dimensions
};
```

TABLE 1-continued

```
//Copy pixel associated with maximum
brightness into new image
foreach(Pixel p in maxShort.Pixels)
{
  //Generate array of pixels
  List<Pixel> pixels = shorts.Select
  (image => image.PixelAt(p.Location));
  //Copy pixel in the array of pixels
  with maximum brightness
  p = pixels.SelectByMaxProperty(pixel => pixel.Luma);
}
```

In the example illustrated in Table 1, the short exposure images are synthesized into a new list (e.g., an array, a collection, etc.) and a new image (e.g., maxShort as an example of the combined short exposure image 820) is generated based on pixel dimensions of the short exposure image (e.g., short 804). The example illustrated in Table 1 then iterates over each pixel in the new short exposure image and, for each pixel, selects a corresponding pixel from the short images to generate an array of pixels from the short images (e.g., shortpixels). The value of the pixel in the new short image is copied from a pixel in the pixel array that has a maximum property (e.g., SelectByMaxProperty). In some aspects, the maximum brightness can be based on luminance or a conversion from multiple parameters into a value for comparison. For example, the individual color values can be used (e.g., RGB) and converted into a relative luminance or a corresponding value that represents a brightness.

In some aspects, the pseudocode in Table 1 generates the combined short exposure image that fills in background content selected from short exposure image 804 and the at least one short exposure image 808. An example flow chart that can be performed by the combined image generator 810 and a visual depiction of the creation of the combined short exposure image 820 is further illustrated herein with reference to FIGS. 10 and 11A-11H.

The combined short exposure image 820 and a long exposure image can be synthesized into an HDR image on bright backgrounds with less or no ghosting. For example, the combined short exposure image 820 can be synthesized with a long exposure image and background content in the ghosting region (e.g., ghosting region 702) will be filled with content from the combined short exposure image to reduce ghosting effects.

In some cases, the motion can occur on a dark background and using the combined short exposure image 820 alone may generate visual artifacts on the dark background. Various techniques can be implemented to improve the motion on the dark background by changing a source of pixels for the HDR image. In one aspect, the example image processing system 800 is configured to change a source of pixels for these regions based on detecting motion and control a filling type based on various parameters using a pixel comparator 812, contour detector 814, and a contour filler 816.

In some aspects, the pixel comparator 812 is configured to make various determinations to identify bad pixels within the combined short exposure image 820. In one aspect, the pixel comparator 812 is configured to detect bad pixels using a comparison of the regions of the combined short exposure image 820 (e.g., a pixel, a group of pixels) scaled based on an exposure ratio and compared to the long exposure image 806. For example, the pixel comparator 812 can multiply a luminance value of a pixel in the combined short exposure image 820 by an exposure ratio to yield a scaled luminance value. An example of an exposure ratio is a proportional difference in exposure time between the long exposure image 806 and the short exposure image 804 and multiplying the regions based on the exposure ratio should achieve a similar exposure level as the long exposure image 806. The scaled luminance value of each region (e.g., a pixel) of the combined short exposure image 820 is compared to the luminance value of each region in the long exposure image 806 and, if the scaled luminance value is less than the long, the identified pixels in the combined short exposure image 820 may be bad pixels. In another aspect, the pixel comparator 812 could also receive the TFI to only operate in motion regions and the contour filling will check for bad pixels inside the motion contours.

The pixel comparator 812 can be configured to detect motion that is captured by comparing the short exposure image 804 with the long exposure image 806. The pixel comparator 812 can multiply a luminance value of a pixel in the short exposure image 804 by an exposure ratio to yield a scaled luminance value and compare the scaled luminance value to a luminance value of the long exposure image 806. If the absolute value of a difference between the scaled luminance value and the luminance value of the long exposure image 806 is greater than a threshold, that pixel can be deemed to potentially contain motion. In some cases, the pixel comparator 812 can determine motion based on determining that a sufficient number of pixels (e.g., 4% of the pixels) potentially contain motion. In some aspects, the pixel comparator 812 can use other types of motion detection, such as an ML model that identifies motion from a single image or multiple images.

The pixel comparator 812 may also be configured to determine if the long exposure image 806 is saturated. In one example, the pixel comparator 812 determines that the long exposure image 806 is saturated if a threshold number of regions (e.g., pixels) have a luma value that is greater than a threshold value (e.g., 65%, 70%, 75%, 80%, or other value). For example, the pixel comparator 812 may determine an image is saturated if at least 70% of 8-bit luma values are greater than 200 (e.g., the maximum luma value is 255).

In the event that the pixel comparator 812 identifies candidate bad pixels (e.g., with a scaled luminance of the max short exposure image or other combined image is less a luminance of the long exposure image), detects motion in the image, and identifies the long exposure image 806 as saturated, the pixel comparator 812 determines that the combined short exposure image 820 contains bad pixels. A flowchart identifying the bad pixels according to some aspects is illustrated herein with reference to FIG. 12 and examples illustrations to explain the flowchart are illustrated in FIGS. 13A-13E.

The contour detector 814 is configured to identify contours within a temporal frame interpolation (TFI) image 822. In some aspects, the TFI image 822 is generated from at least two images (e.g., two short exposure images) that illustrate a difference in pixels at different times (e.g., a temporal difference). An example TFI image 822 is illustrated with reference to FIG. 15A.

In some aspects, the contour filler 816 receives the bad pixels from the pixel comparator 812 and the contours from the contour detector 814 and determines whether to take content from a short exposure image 804 or a long exposure image 806 to fix the bad pixels by detecting bad pixels within a contour and copying the pixels from the short exposure image into the long exposure image to generate the modified long exposure image 824. For example, when bad pixels are detected in a contour, and the number of bad pixels is greater than the noisy pixels of the short exposure image in the contour, the contour filler 816 copies that contour region from the short exposure image into the long exposure image. In some aspects, pixels from the short exposure image 804 or the long exposure image 806 are copied into the HDR image to fix the bad pixels by extracting regions associated with the contours.

Figure 14:
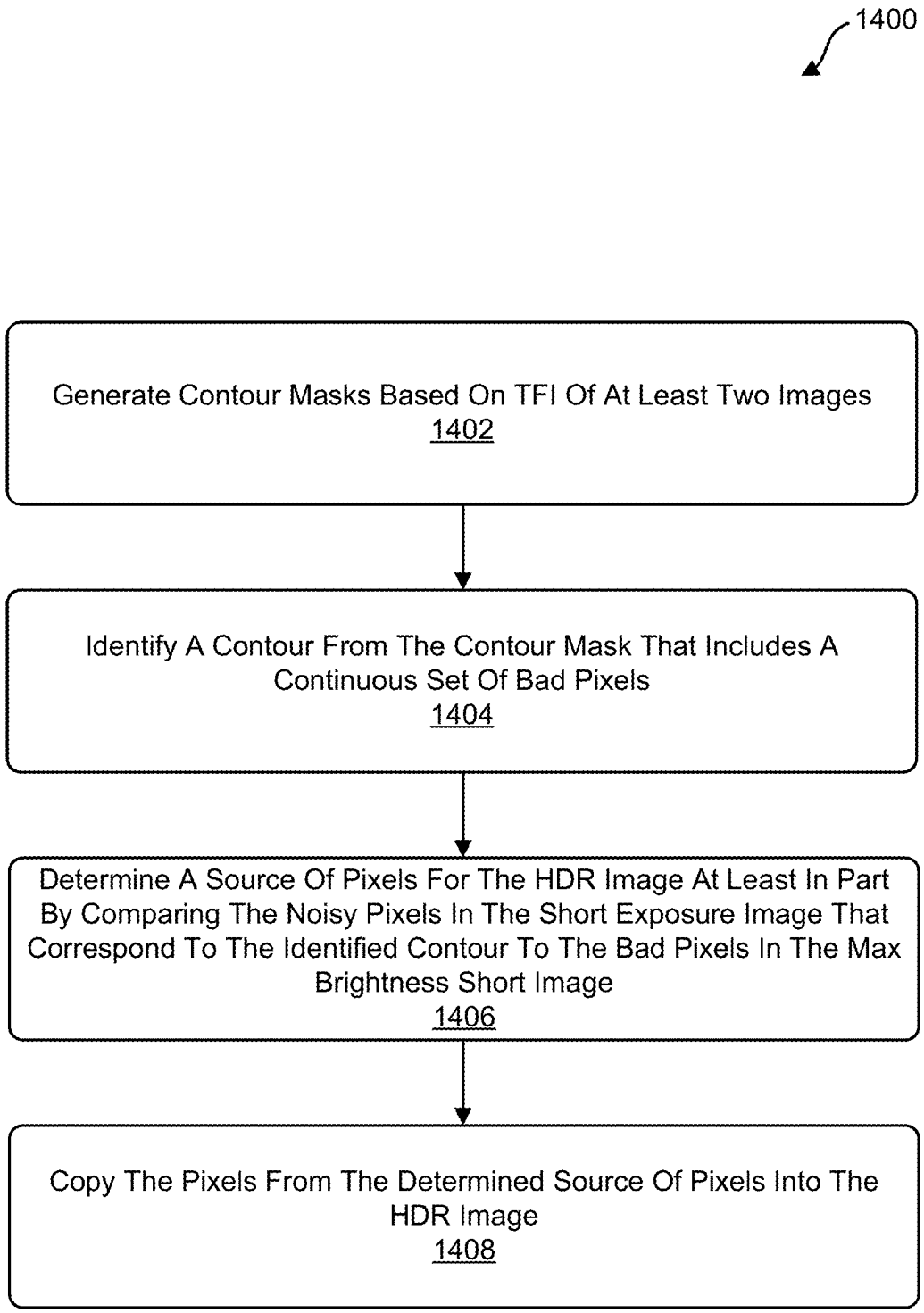
FIG. 14 is a flowchart illustrating an example of a method for using the bad pixels in connection with creating an HDR image, in accordance with aspects of the present disclosure.
Figure 15A:
FIGS. 15A-15E are images of a scene that are captured by a camera and are merged into a maximum brightness short image and bad pixels are detected, in accordance with aspects of the present disclosure.
Figure 15B:
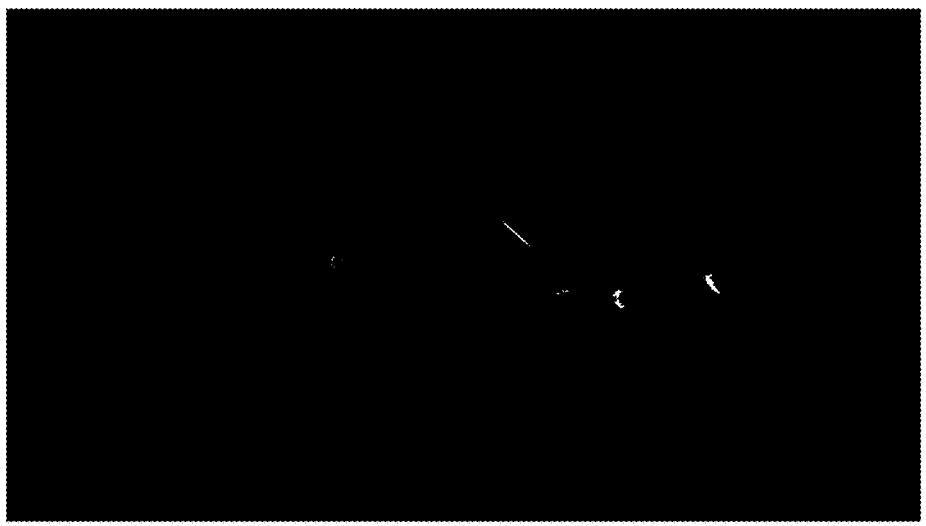
Figure 15C:
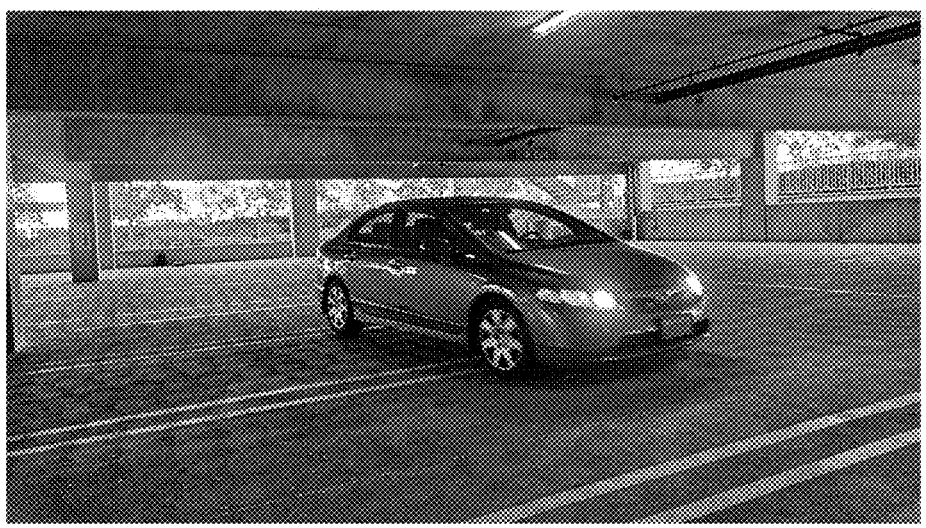

In one illustrative example, the contour filler 816 is configured to identify a contour that corresponds to the location of the bad pixels and copy pixels from the short exposure image 804 or the long exposure image 806 into the HDR image. For example, if the contour region of the maximum brightness short exposure image has a small, saturated area (e.g., less than 3% of pixels are saturated) or the average luma of pixels in the contour region of the short exposure image is low (e.g., less than 3% of the maximum luma value), pixels from the contour region of the long exposure image 806 are copied into the HDR image to fix the bad pixels. If the small area is saturated, the visual difference will be less noticeable and the pixels from the long exposure image 806 will have better visual fidelity. Similarly, if there is more noise in the short exposure image 804, the visual difference will be more noticeable and the pixels from the long exposure image 806 will have better visual fidelity. A flowchart to identify the selective contour filling according to some aspects is illustrated herein with reference to FIG. 14 and examples illustrations to explain the flowchart of FIG. 14 are illustrated in FIGS. 15A-15C.

Figure 9:
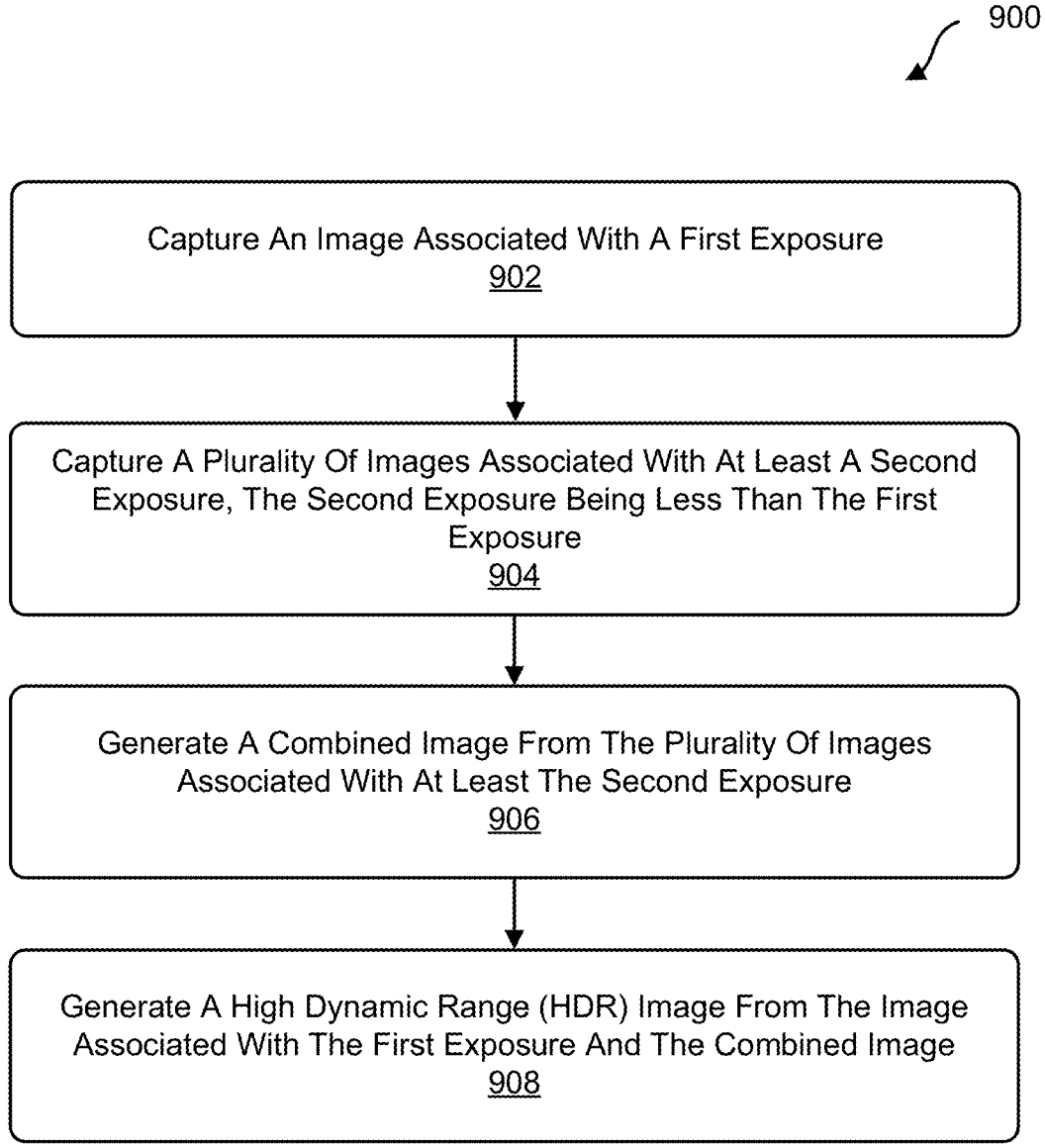
FIG. 9 is a flowchart illustrating an example of a method for synthesizing an HDR image using a background fill technique to reduce ghosting, in accordance with aspects of the present disclosure.

FIG. 9 is a flowchart illustrating an example of a method 900 for synthesizing an HDR image using a background fill technique to reduce ghosting, in accordance with certain of the present disclosure. The method 900 can be performed by a computing device having an image sensor, such as a mobile wireless communication device, a camera, an XR device, a wireless-enabled vehicle, or other computing device. In one illustrative example, a computing system 1900 can be configured to perform all or part of the method 900. In one illustrative example, an ISP such as the ISP 254 or a computing system 1900 can be configured to perform all or part of the method.

At block 902, the computing system may capture an image associated with a first exposure. At block 904, the computing system may capture a plurality of images associated with a second exposure. The second exposure is less than the first exposure. For example, the image may include a long exposure image and the plurality of images may include at least two short exposure images. The short and long exposure images can be captured in any suitable order. For example, in some cases, a first short image can be captured and read out of the image sensor, a long exposure image can be captured and read out of the image sensor, and then another short exposure image can be read out of the image sensor. In some aspects, the short exposure images can have different exposure times, where the different exposure times of the short exposure images are less than an exposure time of the long exposure image.

At block 906, the computing system may generate a combined image from the plurality of images associated with the second exposure (e.g., from the at least two short exposure images). In some cases, the computing system may generate the combined image at least in part by merging the at least two short exposure images based on a maximum saturation. In one illustrative aspect, to generate the combined image, the computing system may merge the short exposure images based on a maximum saturation. In one aspect, the short exposure images each include a plurality of regions and the computing system may, for each region of the plurality of regions in the plurality of images, determine a region from one image of the short exposure images having a highest luma value; and generate the combined image using the determined region. Each region can be a single pixel, but in other aspects can be clusters of pixels or detected regions.

In some cases, motion in the combined image can create noise in the final HDR image and the detected motion may be corrected by copying pixels from various images. In one illustrative aspect, the computing system may detect motion in the image using scaled luma values. For example, the computing system may determine scaled luma values of pixels in the combined image using an exposure ratio, determine that the image associated with the first exposure is saturated, and detect motion in the combined image. The computing system may determine the scaled luma values by multiplying luma values of the pixels in the combined image by the exposure ratio, which is based on a comparison of the first exposure and at least the second exposure. When luma values of at least a threshold number of pixels of the image associated with the first exposure are greater than the scaled luma values, the scaled luma values may be less than luma values of pixels in the image associated with the first exposure.

In one aspect, to determine that the image is saturated, the computing system may determine that a threshold number of pixels of the image have a luma value greater than a threshold value. In this aspect, the motion is detected based on a comparison of the long exposure image to a particular image from the plurality of images associated with at least the at least two short exposure images.

When the image is saturated, the computing system may detect motion based on a number of different pixels based on scaling images by the exposure ratio. In one aspect, the computing system generates second scaled luma values at least in part by scaling a luma value of each pixel of a particular image from the at least two short exposure images by the exposure ratio and determine a number of different pixels between the particular image and the long exposure image at least in part by comparing the scaled luma values of the particular image to a luma value of each pixel of the long exposure image. In this aspect, the motion is detected when the number of different pixels is greater than a threshold value.

The computing system may correct pixels that are created due to the detected motion by copying pixels from one of the images. For example, the computing system may generate a motion mask from the at least two short exposure images, determine a region in the motion mask corresponding to a first set of pixels at least in part by comparing the first set of pixels with the motion mask, determine a second set of pixels from one of the at least two short exposure images that correspond to the region in the motion mask, and replace the first set of pixels in the long exposure image with the second set of pixels.

In other aspects, the computing system may also not correct the pixels because pixels from the short exposure image may have more noise. For example, the computing system may generate a motion mask from the short exposure images, determine a region in the motion mask corresponding to a first set of pixels at least in part by comparing the first set of pixels with the motion mask, determine a second set of pixels from one short exposure images that correspond to the region in the motion mask, and determine to apply the second set of pixels of the region in the motion mask into the long exposure image at least in part by comparing a quality of the second set of pixels to pixels within the motion mask.

To compare the first set of pixels with the motion mask, the computing system may determine a number of pixels in the second set of pixels having one or more luma values that are less than a noise threshold and compare the number of pixels that are less than the noise threshold to a number of the pixels within the motion mask. In this aspect, the second set of pixels are applied into the long exposure image when the number of pixels that are less than the noise threshold is less than the number of bad pixels within the motion mask.

At block 908, the computing system may generate an HDR image from the image associated with the first exposure (e.g., the long exposure image) and the combined image. As described above, the long exposure image may be modified to correct for errors created by motion in the combined image and the final resulting HDR image may reduce ghosting artifacts in the HDR images.

Figure 10:
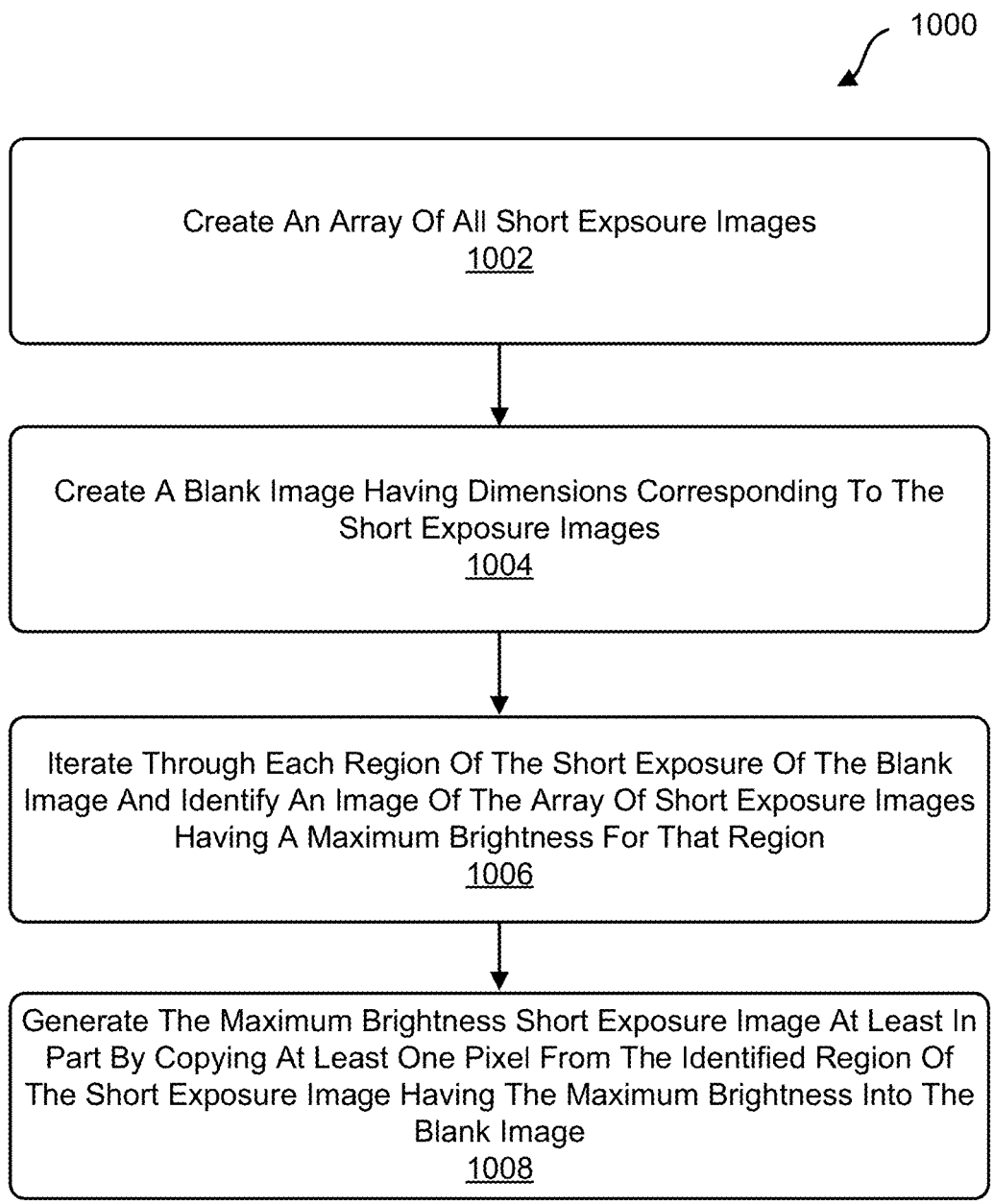
FIG. 10 is a flowchart illustrating an example of a method for generating a generating a maximum brightness image

FIG. 10 is a flowchart illustrating an example of a method 1000 for generating a maximum brightness image, in accordance with certain of the present disclosure. The method 1000 can be performed by a computing device having an image sensor, such as a mobile wireless communication device, a camera, an XR device, a wireless-enabled vehicle, or other computing device. In one illustrative example, an ISP such as a computing system 1900 can be configured to perform all or part of the method 1000.

In some aspects, the computing system may have captured at least two short exposure images. One of the short exposure images may be associated with a long exposure image, and any of the short exposure images can be captured occur before or after the long exposure image. At block 1002, the computing system may generate or create an array (e.g., a list, a collection, etc.) of all of the short exposure images. At block 1004, the computing system may generate or create a blank image having dimensions corresponding to the short exposure images.

The computing system may then iterate through each region of the short exposure of the blank image and identify an image of the array of short exposure images having a maximum brightness for that region at block 1006. At block 1008, the computing system may generate the maximum brightness short exposure image at least in part by copying at least one pixel from the identified region of the short exposure image having the maximum brightness into the blank image. In some aspects, pseudocode to execute the method 1000 is described above with reference to Table 1.

FIGS. 11A-11H are images of a scene that are captured by a camera and are merged into a maximum brightness short image to generate an HDR image, in accordance with some aspects. In one illustrative example, a camera system captures a first short exposure image S1 in FIG. 11A, a second exposure image S2 in FIG. 11B, a long exposure image L1 in FIG. 11C, a third short exposure image S3 in FIG. 11D, a fourth short exposure image S4 in FIG. 11E, and a fifth short exposure image S5 in FIG. 11F. Each of the short exposure images S1-S5 may have an exposure time of 4 milliseconds and the long exposure image may have an exposure time of 20 milliseconds. In this example, the exposure ratio of the long exposure image to the short exposure ratio is the proportional of the exposure times. For example, the exposure ratio for a long exposure image of 20 milliseconds and a short exposure image of 5 milliseconds is 4.

As illustrated in FIGS. 11A-11F, the images S1-S5 and L1 capture images of a person vertically moving arms against a bright background. The short exposure images S1-S5 do not illustrate any motion blur and the long exposure image L1 provides more color information but includes more motion blur due to the longer exposure time. After capturing the short exposure images S1-S5, the camera system can include a computing system (e.g., computing system 1900) to perform the method 1000 to synthesize the short exposure images based on a maximum brightness region to generate the maximum brightness short exposure image, which is illustrated herein with reference to FIG. 11G. The maximum brightness short exposure image in FIG. 11G includes background information present in different short exposure images and removes the arm on the bright background.

Figure 11A:
FIGS. 11A-11H are images of a scene that are captured by a camera and are merged into a maximum brightness short image to generate an HDR image, in accordance with some aspects.
Figure 11B:
Figure 11C:
Figure 11D:
Figure 11E:
Figure 11F:
Figure 11G:
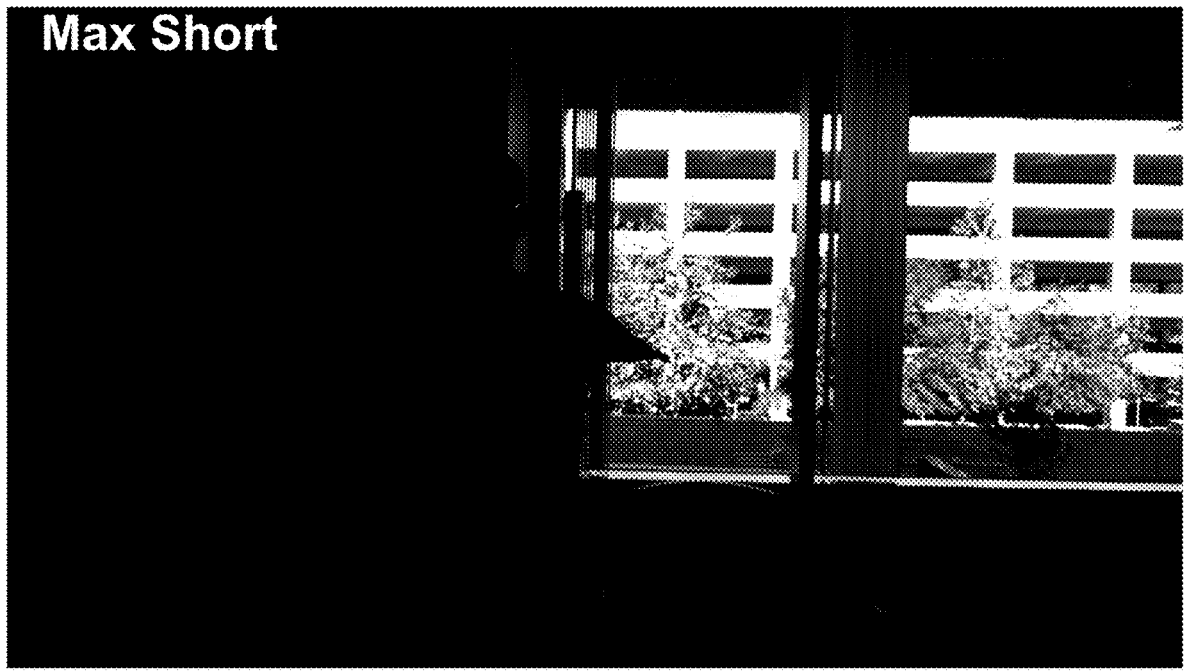
Figure 11H:
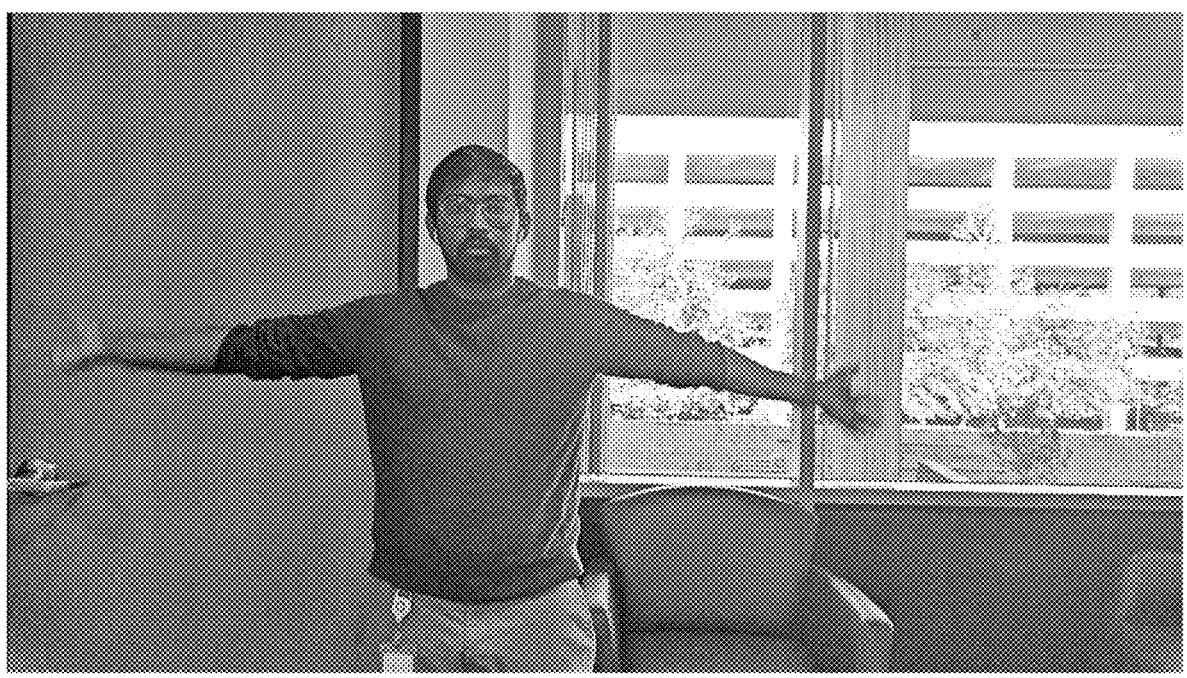

FIG. 11H illustrates an example HDR image that is synthesized based on the maximum brightness short exposure image in FIG. 11G with the long exposure image L1 in FIG. 11C. In the illustrated example, the HDR fusion system takes content from the maximum brightness short exposure image based on the saturation and removes the ghosting region (e.g., the ghosting region 702 in FIG. 7B) and does not include noisy pixels because the dark foreground content is provided from the long exposure image.

Figure 12:
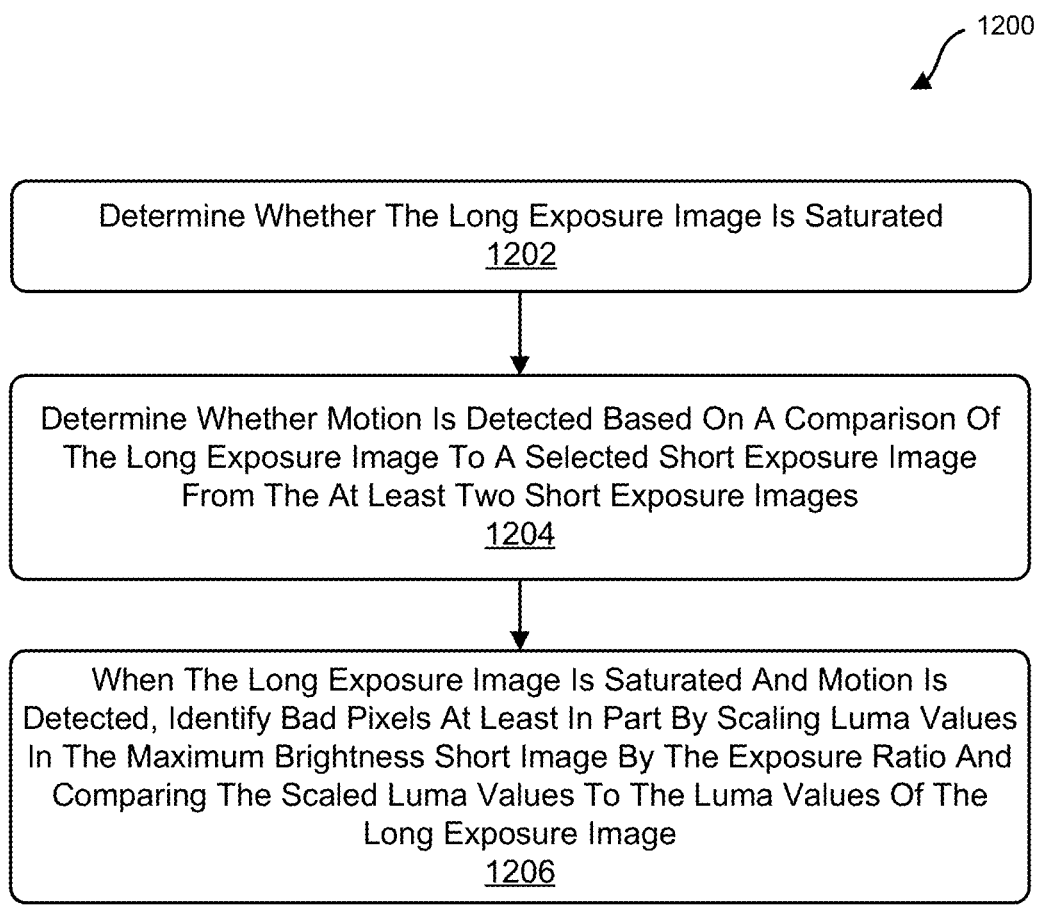
FIG. 12 is a flowchart illustrating an example of a method for detecting bad pixels within the maximum brightness short exposure image, in accordance with some aspects

FIG. 12 is a flowchart illustrating an example of a method 1200 for detecting bad pixels within the maximum brightness short exposure image, in accordance with some aspects. The method 1200 can be performed by a computing device having an image sensor, such as a mobile wireless communication device, a camera, an XR device, a wireless-enabled vehicle, or other computing device. In one illustrative example, an ISP such as the computing system 1900 can be configured to perform all or part of the method 1200.

As described above, when the HDR fusion system generates the maximum brightness short exposure image, a dark background region may not be filled in from the short exposure images and the pixels may be deemed bad. In some aspects, the method 1200 may be performed to detect the bad pixels before any corrective action is taken.

In some aspects, the computing system may determine whether the long exposure image is saturated at block 1202. The saturation of the long exposure image can be detected in various manners such as a logical binary determination, or in some cases an ML model can detect the saturation. In some aspects, Table 2 below illustrates simplified code to detect whether the long exposure image is saturated.

TABLE 2

```
//Generate array of pixels that are saturated
List<Pixel> saturated = long.Pixels.
Where(pixel => pixel.IsSaturated( ));
float saturationRatio = saturated.Count/
longExposureImage.Pixels.Count;
bool isSaturated = saturationRatio > 0.03;
```

The code illustrated in Table 2 builds a list of saturated pixels from the long exposure image using a lambda expression. In particular, the lambda function projects each pixel in the long exposure image into a function to detect saturation of a pixel and, if saturated, the lambda function selects that pixel. A saturation ratio is then calculated based on dividing the number of saturated pixels (e.g., using a count property of the array) by a total number of pixels in the long exposure image, and saturation is detected based on comparing the saturation ratio to a threshold (e.g., 0.03 or 3%).

In some aspects, the saturation is detected based on determining that a number of pixels are overexposed. In some cases, an individual pixel may be saturated based on a having a brightness (e.g., luma, luminance) compared to a threshold (e.g., a scalar value of 200, 225, 255, or other value for 8-bit pixel values). The saturation of the image is detected when a ratio of the pixels is greater than a brightness threshold (e.g., a threshold of 40%).

At block 1204, the computing system may further determine that motion is detected based on a comparison of the long exposure image to a selected short exposure image from the at least two short exposure images. In some aspects, Table 3 below illustrates simplified code to detect motion in at least two images. The motion can be detected in a number of ways such as implementing an ML model that uses a single image or an ML model that uses multiple images.

TABLE 3

```
int differentPixels = 0;
int lumaThreshold = 16;
foreach (Pixel pixel in shortImage.Pixels)
{
    pixel longImagePixel = longImage.PixelAt
    (pixel.Location);
    float difference = Math.AbsoluteValue
    (longImagePixel.Luma – pixel.Luma);
    if (difference > lumaThreshold)
    {
        differentPixels += 1;
    }
}
float motionThreshold = 0.04;
float differenceRatio = differentPixels /
shortImage.Pixels.Count;
bool isMotion = differenceRatio > motionThreshold 0.04;
```

In the example illustrated in Table 3, each pixel of the short exposure image is iterated through and compared to a corresponding pixel in the long exposure image. After identification of the pixels, the illustrative example computes an absolute value of a difference in the luma of the pixel in the long image and the luma of the pixel in the short exposure image. If the difference is greater than a luma threshold, the pixels of the long exposure and the short exposure image are deemed different and the different pixel counter is incremented. After counting the different pixels, a ratio is computed by dividing the number of different pixels based on the total number of pixels in either the short exposure image or the long exposure image. If the ratio is greater than or equal to the motion threshold (e.g., 0.04 or 4%), motion is detected.

In the described aspects, the pixels are iterated as a single list for purposes of clarity but images may be implemented as two-dimensional arrays of pixels. Other aspects may use different regions of the images may be compared based on object detection, groups of pixels can be clustered, masks, and so forth.

At block 1206, based on a determination that the long exposure image is saturated and motion is detected, the computing system may determine scaled luminance value at least in part by multiplying a luminance value of pixels of the highlight region in the combined image by an exposure ratio. When the long exposure image is not saturated or motion is not detected, the computing system determines that the maximum brightness short exposure image fills the background region. However, when the long exposure image is saturated and motion is detected, the computing system determines that the determines that the maximum brightness short exposure image may not adequately fill in the background region. In some aspects, Table 4 below illustrates simplified code to detect compute scaled luminance values of a contour region.

TABLE 4

```
Float exposureRatio = (LongExposureTime -
    ShortExposureTime) / ShortExposureTime;
Mask mask = new Mask( ) { Dimensions =
maxShort.Dimensions };
foreach (var pixel in mask.Pixels)
{
  isBadPixel = (maxShort.PixelAt(pixel.Location).
  Luma * exposureRatio) <
    long.PixelAt(pixel.Location).Luma
  pixel.Color = (isBadPixel) ? Color.White : Color.Black;
}
```

In the example illustrated in Table 4, bad pixel detection starts by computing the exposure ratio. The short exposure images multiplied by the exposure ratio should increase luma to be equal to or greater than the luma of the long exposure image. In some cases, additional tolerances and noise can be factored into this comparison. A mask is generated, which is an array of binary values (e.g., black or white) based on the dimensions of the maximum brightness short exposure image. The mask is iterated over each pixel and, for each pixel, a bad pixel value is determined based on a comparison of the maximum brightness short exposure image scaled by the exposure ratio to the luma of the corresponding pixel in the long exposure image. The last expression is a ternary operator (or conditional operator) that sets the color of the pixel to white in the event of a bad pixel or sets the color of the pixel to white if not a bad pixel. An example mask generated by the code in Table 4 is illustrated herein with reference to FIG. 13E.

Figure 13A:
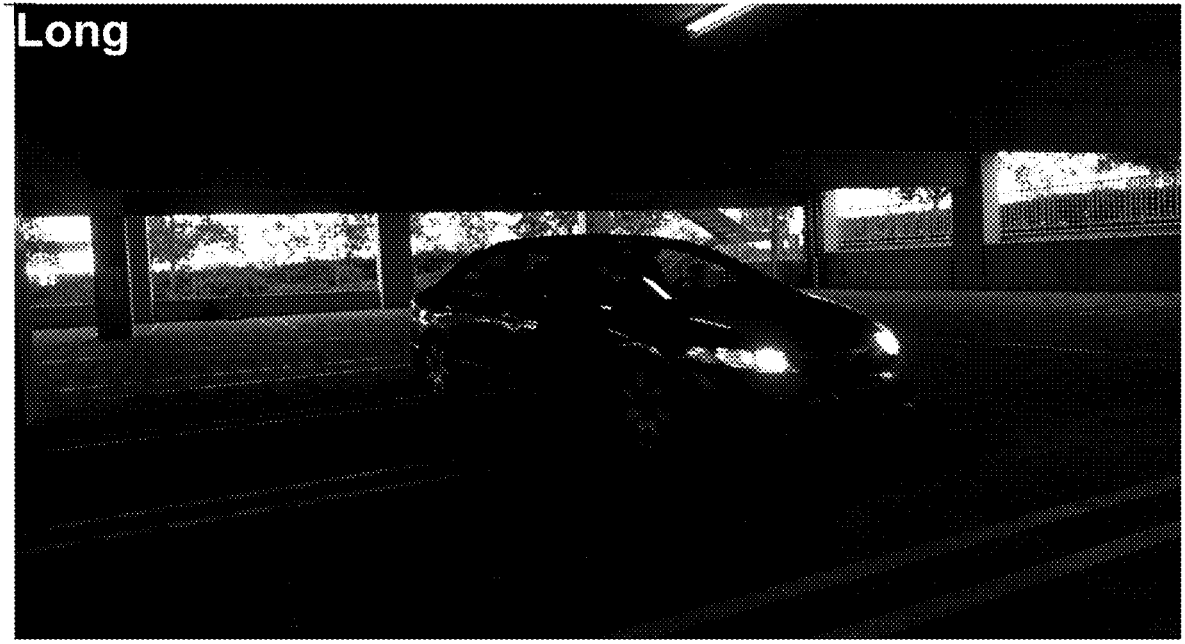
FIGS. 13A-13E are images of a scene that are captured by a camera and are merged into a maximum brightness short image and bad pixels are detected, in accordance with aspects of the present disclosure.
Figure 13B:

FIGS. 13A-13E are images of a scene that are captured by a camera and are merged into a maximum brightness short exposure image and bad pixels are detected, in accordance with some aspects. FIG. 13A illustrates a long exposure image of a car that is captured in a parking garage while moving with the headlights on (e.g., a bright foreground and a dark background) and FIG. 13B is short exposure image that is captured either before or after the long exposure image.

Figure 13C:
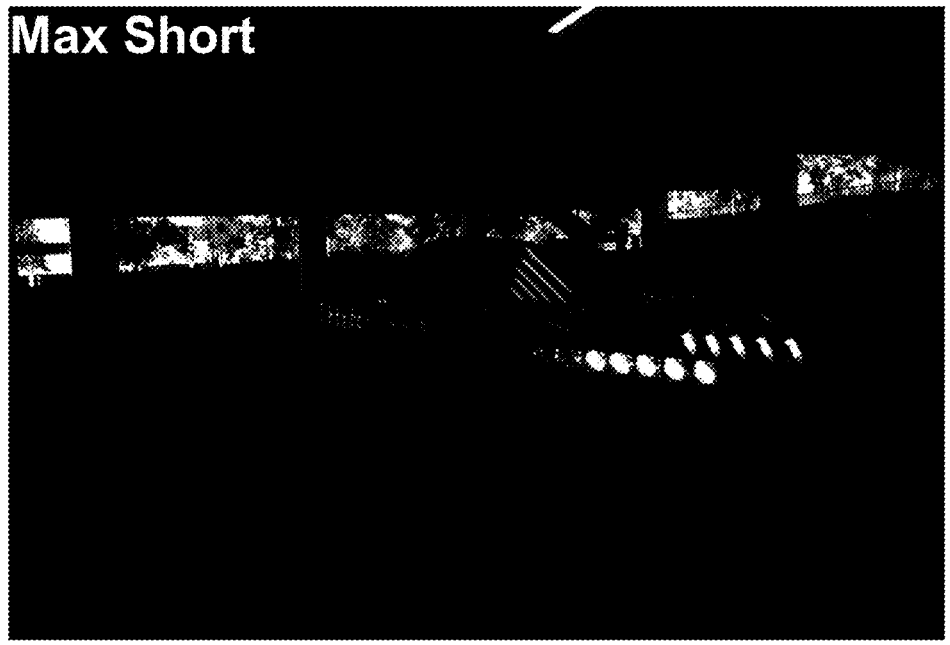
Figure 13D:
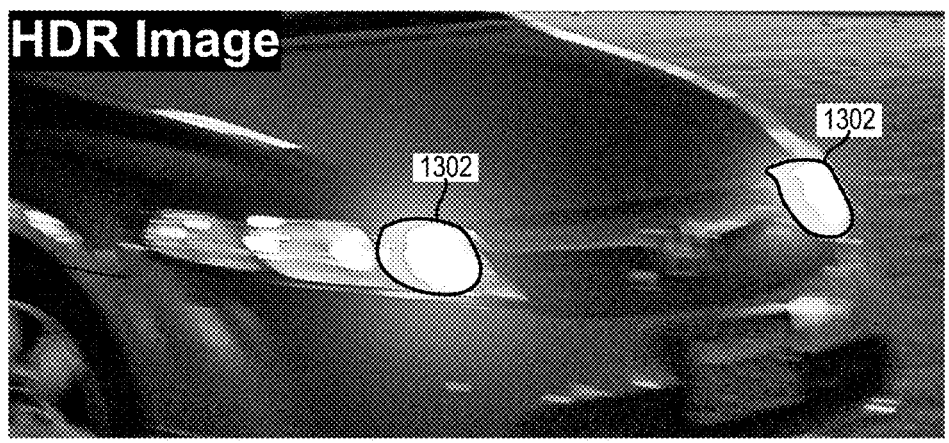
Figure 13E:
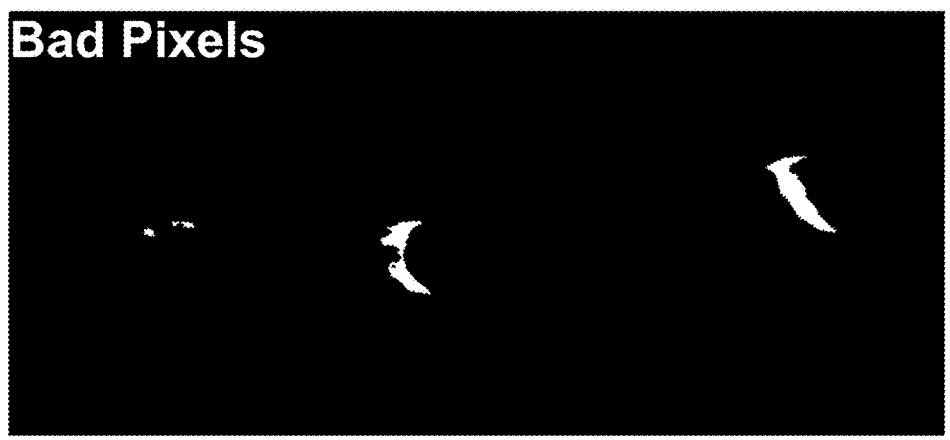

Although not shown, additional short exposure images are captured and synthesized into the maximum brightness short exposure image illustrated in FIG. 13C. In FIG. 13C, five different short exposure images are captured at different times and illustrate that the headlights of the car at distinct times. FIG. 13D illustrates an HDR image that is generated based on the maximum brightness short exposure image and the long exposure image. The HDR image in FIG. 13D includes visual artifacts in region 1302 because the maximum brightness short exposure image did not fill an entire region and generates an inadvertent glowing effect in region 1302 based on the motion of the car. Because the car is moving to the right, pixels left of the headlight in region 1302 have a higher luma FIG. 13E illustrates a result of the bad pixel detection method 1200 described above and illustrated in FIG. 12. In particular, the bad pixel masks identify pixels associated with the lights on the car while is moving and correspond to the glowing effect illustrated in FIG. 13D. As described above, the bad pixels can be used as a basis for contour detection and contour filling to prevent the effects illustrated in FIG. 13D.

FIG. 14 is a flowchart illustrating an example of a method 1400 for using the bad pixels in connection with creating an HDR image, in accordance with aspects of the present disclosure. The method 1400 can be performed by a computing device having an image sensor, such as a mobile wireless communication device, a camera, an XR device, a wireless-enabled vehicle, or other computing device. In one illustrative example, an ISP such as the computing system 1900 can be configured to perform all or part of the method 1400.

As described above, when the HDR fusion system generates the maximum brightness short exposure image, a dark background region may not be filled in from the short exposure images and the pixels may be deemed bad.

In some aspects, the computing system may generate contour masks based on TFI of at least two images at block 1402. In one example, a comparison of two images (e.g. frames) that are captured at different times is used to generate a contour mask that indicates a substantial difference in pixels. Because the images have a temporal difference, the contour mask includes a plurality of regions that can illustrate motion. An example contour mask is illustrated herein with reference to FIG. 15A.

The computing system may be configured to determine bad pixels associated with the maximum brightness short exposure image and generate a mask of the bad pixels. The bad pixels may be grouped into a contiguous set of pixels (e.g., a continuous set of pixels) that are grouped based on being adjacent to other bad pixels at block 1404. Based on the contour masks at block 1402 and the bad pixels, the computing system may identify a contour within the contour mask that includes each pixel in a single group of contiguous pixels. In some aspects, there may be multiple sets of bad pixels and block 1404 may identify different contours corresponding to bad pixels. The computing system may minimize the number of pixels because the contours are used for filling in information, and smaller substitutions may be used to minimize visual artifacts.

At block 1406, the computing system may determine a source of pixels for the HDR image at least in part by comparing the noisy pixels in the short exposure image that correspond to the identified contour to the bad pixels in the max brightness short exposure image. In some aspects, at block 1406, the computing system is determining a visual fidelity of pixels to use in the HDR image based on the bad pixels. In some cases, the pixels of the short exposure image are too noisy based on the shorter exposure time and, in other cases, the artifacts created by the maximum brightness short exposure image are larger than the noisy pixels. In some aspects, Table 5 below illustrates simplified code to determine a source of pixels for the HDR image based on comparing the noise to the number of bad pixels.

TABLE 5

```
Image contour = IdentifyContourByPixelMask
(badPixels, contours)
Image region = ExtractRegionPixels
(maxShort, contour);
int noise = short.SelectPixelGroup(region.Pixels)
  .Where(pixel => pixel.Luma < threshold).Count( );
int bad = badPixels.Where(pixel =>
pixel.Color == Color.White).Count( );
var useShortExposure = (noise <= bad);
```

In the example illustrated in Table 5, a contour is extracted based on a region of contiguous bad pixels, and then an image region is extracted from them the maximum brightness short exposure image that corresponds to the contour. The number of noise pixels is calculated based on a count of pixels in the contour region that have a luma value less than a threshold. The number of bad pixels is calculated based on a number of pixels identified in the bad pixel region. In one aspect, the contour filling process determines to use the short exposure image when the number of noisy pixels is less than the number of bad pixels. Variations of this process would correspond to the process in Table 5. For example, an ML model may be trained to determine a visual representation of noise and determine a best set of pixels from the perspective of a potential person.

After determining the source of pixels, the computing system may copy the determine source of pixels into the HDR image at block 1408. The computing system may copy the source of pixels in different manners such as, for example, providing a supplemental image to an HDR fusion system. In some aspects, the HDR fusion system is configured to synthesize an HDR image based on the short exposure image (e.g., a maximum brightness short exposure image) and the long exposure image. In various aspects, the supplemental image provided to the HDR image may provide extra information to determine how the short exposure image and the long exposure image converge into the HDR image. As described above, the contour filling process (e.g., performed by the pixel comparator 812, contour detector 814, and contour filler 816) may build a modified long exposure image 824 that has pixels that can be provided to an HDR image fusion system. In some other aspects, the HDR fusion process (e.g., by the fusion device 818) can be modified to include the above methods to improve HDR image synthesis.

A high quality HDR image can be generated using a maximum brightness short exposure image can be used with a dark object on a bright background and a bright object on a dark background without significant correction. In this case, a dark object on a bright background would show no ghosting and high motion blur when the content in the HDR image is taken from the long exposure image 806, and a bright object on a dark background would show ghosting and high motion blur when the content in the HDR image is taken from the long exposure image 806.

In some aspects, the pixel comparator, and contour detector, and a contour filler can perform a contour filling in combination with the maximum brightness short exposure image in the event of a dark object on a bright background, a bright object on a moderately dark background, and a bright object on a very dark background. For example, a dark object on a bright background would show no ghosting and high motion blur when content is taken from the long exposure image 806, a bright object on a moderately dark background would show no ghosting and low motion blur when content is taken from the short exposure image 804, and a bright object on a very dark background would show no ghosting, low motion blur, and high noise when content taken from the short exposure image 804.

In some other aspects, the pixel comparator 812, contour detector 814, and a contour filler 816 can perform a hybrid flow that uses the contour filling in the event of a dark object on a bright background, a bright object on a moderately dark background, and a bright object on a very dark background. For example, a dark object on a bright background would show no ghosting and high motion blur when content is taken from the long exposure image 806, a bright object on a moderately dark background would show no ghosting with low motion blur when content is taken from the short exposure image 804, and a bright object on a very dark background would show moderate ghosting and high motion blur when content is taken from the long exposure image 806.

FIGS. 15A-15C are images of a scene that are captured by a camera and are merged into a maximum brightness short exposure image and bad pixels are detected, in accordance with aspects of the present disclosure. FIG. 15A illustrate a contours that are detected by a contour detected (e.g., contour detector 814). For example, the contour detector can receive a TFI based on an interpolation of a short exposure image and a long exposure image and generate a binary mask in FIG. 15A that illustrates differences between the images. In the binary mask illustrated in FIG. 15A, a black pixel indicates areas that indicate potential motion.

FIG. 15B illustrates a mask that identifies bad pixels of at least one contour region that is configured by a contour filler (e.g., contour filler 816). In the illustrated example of FIG. 15B, the bad pixels correspond to a region associated with headlights of a moving car that are deemed to be bad. Accordingly, the contour filler can elect to use pixels associated with the back pixels from a different image. For example, as described above, the contour filler can use the pixels from the long exposure image or the short exposure image based on a comparison of noisy pixels to bad pixels. In some aspects, the extra pixels that are identified and used to generate a supplemental image that is used to correct the resulting HDR image fusion process. In some aspects, the extra pixels are provided to the HDR fusion system to force the HDR fusion system to select pixels for a particular region during the fusion process. In other aspects, the selected pixels may be merged into a particular image such as the long exposure image, the maximum brightness short exposure image, or a short exposure image.

FIG. 15C illustrates an example of filling the HDR image and illustrate that the region that is to the left of the headlights have sufficient color separation to illustrate a physical aspect of the moving vehicle.

Figure 15D:
Figure 15E:

FIG. 15D illustrates an example of filling the HDR image with the maximum brightness short exposure image, which results in bad pixels in some cases. In particular, pixel defects may occurs in certain regions when the maximum brightness short exposure image is synthesized with the long exposure image. In particular, region 1502 includes a grey region adjacent to the subject's thumb than can be deemed bad pixels as described above. In the event of bad pixels, some aspects may determine whether to use pixels from another short exposure image. FIG. 15E illustrates an example of corresponding short exposure image associated with FIG. 15D and illustrates that the foreground subject includes more noise than the long exposure image. As described above with respect to FIG. 14, the HDR fusion system can select a source of pixels based on a tradeoff associated with noise and bad pixels. The bad pixels can be detected in the maximum brightness short exposure image or other aspects may detect the bad pixels in a fully generated HDR image. In some aspects, an ML model can be generated to determine a visual quality associated with bad pixels and determine the source of the pixels based on a training criteria. Other techniques may be used to correct the bad pixels illustrated in FIG. 15D while minimizing the noise associated with the pixels in FIG. 15E.

Figure 16:
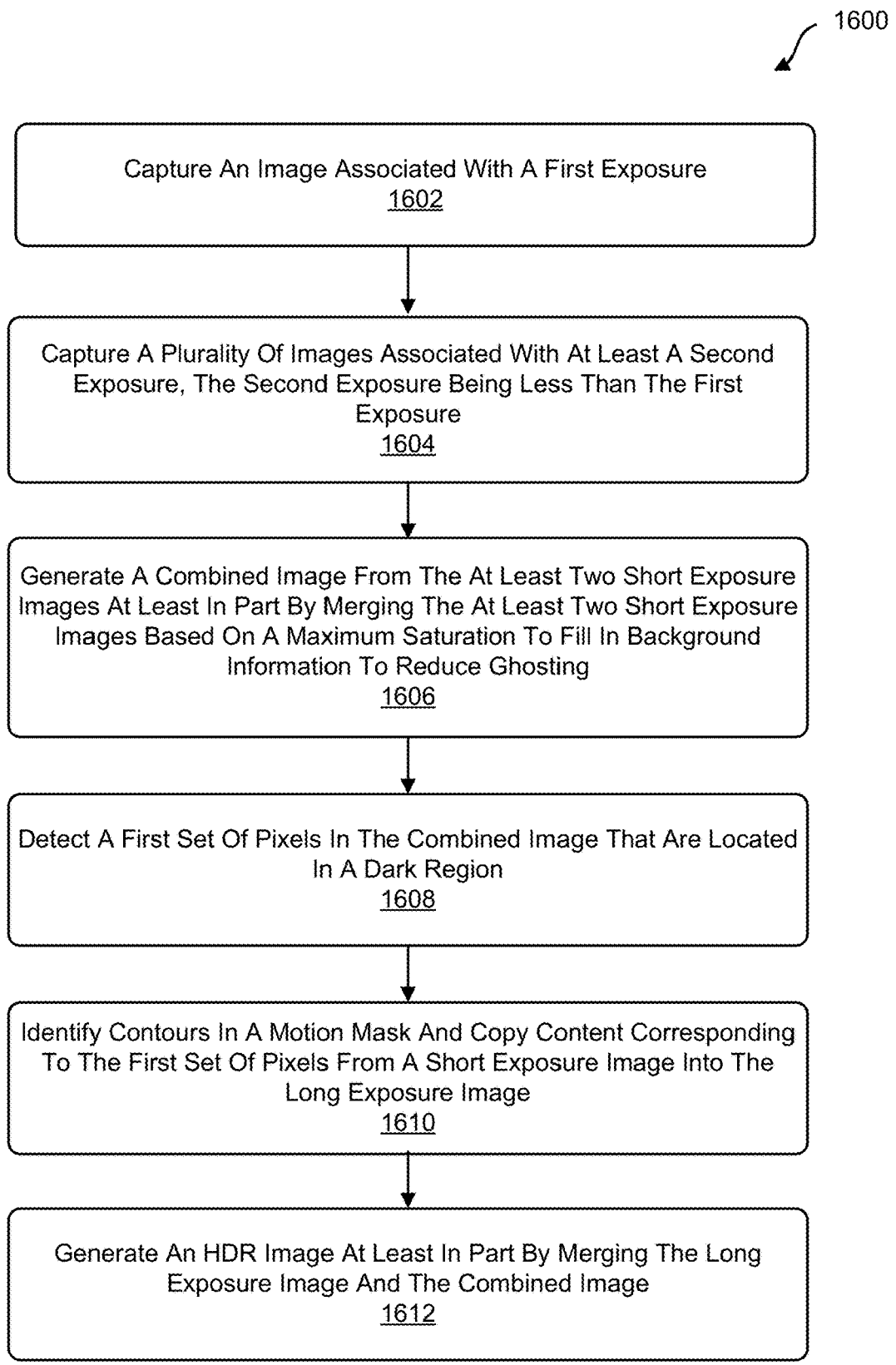
FIG. 16 is a flowchart illustrating an example of another method for synthesizing an HDR image using a background fill technique to reduce ghosting, in accordance with aspects of the present disclosure.

FIG. 16 is a flowchart illustrating an example of a method 1600 for synthesizing an HDR image using a background fill technique to reduce ghosting, in accordance with certain of the present disclosure. The method 160000 can be performed by a computing device having an image sensor, such as a mobile wireless communication device, a camera, an XR device, a wireless-enabled vehicle, or other computing device. In one illustrative example, a computing system 1900 can be configured to perform all or part of the method 900. In one illustrative example, an ISP such as the ISP 254 can be configured to perform all or part of the method.

At block 1602, the computing system may capture a long exposure image. At block 1604, the computing system may capture at least two short exposure images. Although the method 1600 illustrates a long exposure image captured by short exposure images, the images can be captured in any suitable order. For example, a first short image can be captured and read out of the image sensor, a long exposure image can be captured and read out of the image sensor, and then another short exposure image can be read out of the image sensor. In some aspect, the short exposure images can have different exposure times, and the exposure times are less than an exposure time of the long exposure image.

After capturing the images, the computing system may generate a combined image from the at least two short exposure images at least in part by merging the at least two short exposure images based on a maximum saturation to fill in background information to reduce ghosting at block 1606. Examples of merging the at least two short exposure images based on a maximum saturation to fill in background information to reduce ghosting are described above with reference to FIG. 10.

The computing system may detect a first set of pixels in the combined image that are located in a dark region at block 1608. An example of detecting pixels in a dark region is described above with reference to FIG. 12.

At block 1610, the computing system may identify contours in a motion mask and copy content corresponding to the first set of pixels from one image of the short exposure images into the long exposure image. In one illustrative example, pixels from the short exposure image can be copied into the long exposure image based on a comparison of the pixel regions, as described above with reference to FIG. 14.

At block 1612, the computing system may generate an HDR image from the long exposure image and the combined image. As described above, the long exposure image may be modified to correct for errors created by motion in the combined image and the final resulting HDR image may reduce ghosting artifacts in the HDR images.

In some examples, the processes described herein (e.g., methods 900, 1000, 1200, 1400, and 1600, and/or other process described herein) may be performed by a computing device or apparatus. In one example, the methods 900, 1000, 1200, 1400, and 1600 can be performed by a computing device (e.g., image capture and processing system 200 in FIG. 2) having a computing architecture of the computing system 1900 shown in FIG. 18.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the methods described herein, including the methods 900, 1000, 1200, 1400, and 1600. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of methods described herein. In some examples, the computing device may include a display, a network interface configured to communicate and/or receive the data, any combination thereof, and/or other component(s). The network interface may be configured to communicate and/or receive IP-based data or other type of data.

The components of the computing device can be implemented in circuitry. For example, the components can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein.

The methods 900, 1000, 1200, 1400, and 1600 are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the methods.

The methods 900, 1000, 1200, 1400, and 1600, and/or other method or process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 17:
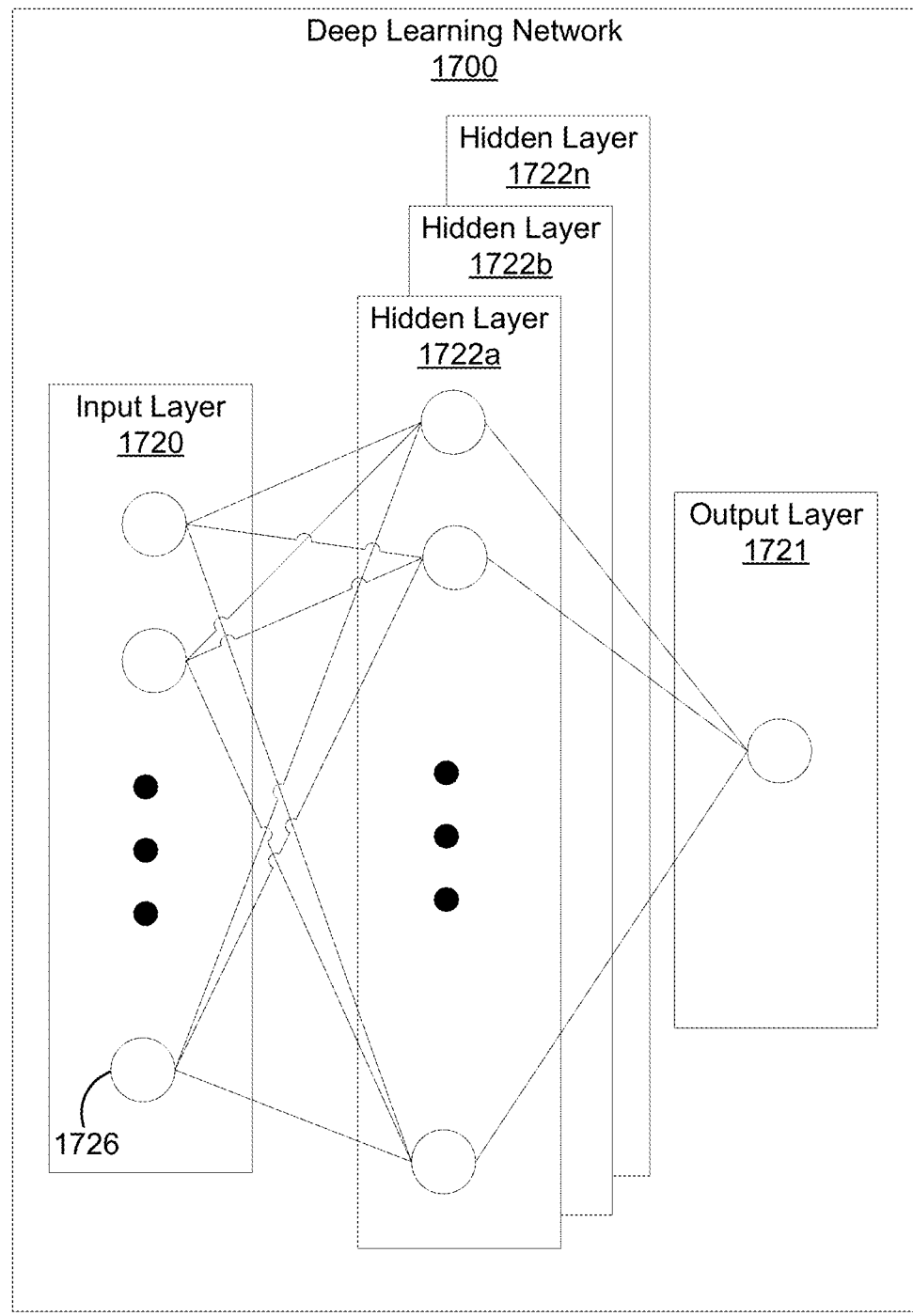
FIG. 17 is an illustrative example of a deep learning neural network that can be used to implement the machine learning based alignment prediction, in accordance with aspects of the present disclosure.

As noted above, various aspects of the present disclosure can use machine learning models or systems. FIG. 17 is an illustrative example of a deep learning neural network 1700 that can be used to implement the machine learning based alignment prediction described above. An input layer 1720 includes input data. In one illustrative example, the input layer 1720 can include data representing the pixels of an input video frame. The neural network 1700 includes multiple hidden layers 1722a, 1722b, through 1722n. The hidden layers 1722a, 1722b, through 1722n include "n" number of hidden layers, where "n" is an integer greater than or equal to one. The number of hidden layers can be made to include as many layers as needed for the given application. The neural network 1700 further includes an output layer 1721 that provides an output resulting from the processing performed by the hidden layers 1722a, 1722b, through 1722n. In one illustrative example, the output layer 1721 can provide a classification for an object in an input video frame. The classification can include a class identifying the type of activity (e.g., looking up, looking down, closing eyes, yawning, etc.).

The neural network 1700 is a multi-layer neural network of interconnected nodes. Each node can represent a piece of information. Information associated with the nodes is shared among the different layers and each layer retains information as information is processed. In some cases, the neural network 1700 can include a feed-forward network, in which case there are no feedback connections where outputs of the network are fed back into itself. In some cases, the neural network 1700 can include a recurrent neural network, which can have loops that allow information to be carried across nodes while reading in input.

Information can be exchanged between nodes through node-to-node interconnections between the various layers. Nodes of the input layer 1720 can activate a set of nodes in the first hidden layer 1722*a*. For example, as shown, each of the input nodes of the input layer 1720 is connected to each of the nodes of the first hidden layer 1722*a*. The nodes of the first hidden layer 1722*a* can transform the information of each input node by applying activation functions to the input node information. The information derived from the transformation can then be passed to and can activate the nodes of the next hidden layer 1722*b*, which can perform their own designated functions. Example functions include convolutional, up-sampling, data transformation, and/or any other suitable functions. The output of the hidden layer 1722*b* can then activate nodes of the next hidden layer, and so on. The output of the last hidden layer 1722*n* can activate one or more nodes of the output layer 1721, at which an output is provided. In some cases, while nodes (e.g., node 1726) in the neural network 1700 are shown as having multiple output lines, a node has a single output and all lines shown as being output from a node represent the same output value.

In some cases, each node or interconnection between nodes can have a weight that is a set of parameters derived from the training of the neural network 1700. Once the neural network 1700 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 1700 to be adaptive to inputs and able to learn as more and more data is processed.

The neural network 1700 is pre-trained to process the features from the data in the input layer 1720 using the different hidden layers 1722*a*, 1722*b*, through 1722*n* in order to provide the output through the output layer 1721. In an example in which the neural network 1700 is used to identify features and/or objects in images, the neural network 1700 can be trained using training data that includes both images and labels, as described above. For instance, training images can be input into the network, with each training frame having a label indicating the features in the images (for a feature extraction machine learning system) or a label indicating classes of an activity in each frame. In one example using object classification for illustrative purposes, a training frame can include an image of a number 2, in which case the label for the image can be [0 0 1 0 0 0 0 0 0 0].

In some cases, the neural network 1700 can adjust the weights of the nodes using a training process called backpropagation. As noted above, a backpropagation process can include a forward pass, a loss function, a backward pass, and a weight update. The forward pass, loss function, backward pass, and parameter update is performed for one training iteration. The process can be repeated for a certain number of iterations for each set of training images until the neural network 1700 is trained well enough so that the weights of the layers are accurately tuned.

For the example of identifying features and/or objects in images, the forward pass can include passing a training image through the neural network 1700. The weights are initially randomized before the neural network 1700 is trained. As an illustrative example, a frame can include an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

As noted above, for a first training iteration for the neural network 1700, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 1700 is unable to determine low level features and thus cannot make an accurate determination of what the classification of the object might be. A loss function can be used to analyze error in the output. Any suitable loss function definition can be used, such as a Cross-Entropy loss. Another example of a loss function includes the mean squared error (MSE), defined as $E_{total}=\Sigma \frac{1}{2}(\text{target}-\text{output})^2$. The loss can be set to be equal to the value of $E_{total}$.

The loss (or error) will be high for the first training images since the actual values will be much different than the predicted output. The goal of training is to minimize the amount of loss so that the predicted output is the same as the training label. The neural network 1700 can perform a backward pass by determining which inputs (weights) most contributed to the loss of the network, and can adjust the weights so that the loss decreases and is eventually minimized. A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, $w_i$ denotes the initial weight, and η denotes a learning rate. The learning rate can be set to any suitable value, with a high learning rate including larger weight updates and a lower value indicating smaller weight updates.

The neural network 1700 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. The neural network 1700 can include any other deep network other than a CNN, such as an autoencoder, a deep belief nets (DBNs), a Recurrent Neural Networks (RNNs), among others.

FIG. 18 is an illustrative example of a CNN 1800. The input layer 1820 of the CNN 1800 includes data representing an image or frame. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 1822a, an optional non-linear activation layer, a pooling hidden layer 1822b, and fully connected hidden layers 1822c to get an output at the output layer 1824. While only one of each hidden layer is shown in FIG. 18, one of ordinary skill will appreciate that multiple convolutional hidden layers, non-linear layers, pooling hidden layers, and/or fully connected layers can be included in the CNN 1800. As previously described, the output can indicate a single class of an object or can include a probability of classes that best describe the object in the image.

The first layer of the CNN 1800 is the convolutional hidden layer 1822a. The convolutional hidden layer 1822a analyzes the image data of the input layer 1820. Each node of the convolutional hidden layer 1822a is connected to a region of nodes (pixels) of the input image called a receptive field. The convolutional hidden layer 1822a can be considered as one or more filters (each filter corresponding to a different activation or feature map), with each convolutional iteration of a filter being a node or neuron of the convolutional hidden layer 1822a. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 1822a. Each connection between a node and a receptive field for that node learns a weight and, in some cases, an overall bias such that each node learns to analyze its particular local receptive field in the input image. Each node of the hidden layer 1822a will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 1822a is due to each node of the convolutional layer being applied to its corresponding receptive field. For example, a filter of the convolutional hidden layer 1822a can begin in the top-left corner of the input image array and can convolve around the input image. As noted above, each convolutional iteration of the filter can be considered a node or neuron of the convolutional hidden layer 1822a. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 1822a. For example, a filter can be moved by a step amount (referred to as a stride) to the next receptive field. The stride can be set to 1 or other suitable amount. For example, if the stride is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 1822a.

The mapping from the input layer to the convolutional hidden layer 1822a is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a stride of 1) of a 28×28 input image. The convolutional hidden layer 1822a can include several activation maps in order to identify multiple features in an image. The example shown in FIG. 18 includes three activation maps. Using three activation maps, the convolutional hidden layer 1822a can detect three different kinds of features, with each feature being detectable across the entire image.

In some examples, a non-linear hidden layer can be applied after the convolutional hidden layer 1822a. The non-linear layer can be used to introduce non-linearity to a system that has been computing linear operations. One illustrative example of a non-linear layer is a rectified linear unit (ReLU) layer. A ReLU layer can apply the function $f(x)=\max(0, x)$ to all of the values in the input volume, which changes all the negative activations to 0. The ReLU can thus increase the non-linear properties of the CNN 1800 without affecting the receptive fields of the convolutional hidden layer 1822a.

The pooling hidden layer 1822b can be applied after the convolutional hidden layer 1822a (and after the non-linear hidden layer when used). The pooling hidden layer 1822b is used to simplify the information in the output from the convolutional hidden layer 1822a. For example, the pooling hidden layer 1822b can take each activation map output from the convolutional hidden layer 1822a and generates a condensed activation map (or feature map) using a pooling function. Max-pooling is one example of a function performed by a pooling hidden layer. Other forms of pooling functions be used by the pooling hidden layer 1822a, such as average pooling, L2-norm pooling, or other suitable pooling functions. A pooling function (e.g., a max-pooling filter, an L2-norm filter, or other suitable pooling filter) is applied to each activation map included in the convolutional hidden layer 1822a. In the example shown in FIG. 18, three pooling filters are used for the three activation maps in the convolutional hidden layer 1822a.

In some examples, max-pooling can be used by applying a max-pooling filter (e.g., having a size of 2×2) with a stride (e.g., equal to a dimension of the filter, such as a stride of 2) to an activation map output from the convolutional hidden layer 1822a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 1822a having a dimension of 24×24 nodes, the output from the pooling hidden layer 1822b will be an array of 18×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 1800.

The final layer of connections in the network is a fully-connected layer that connects every node from the pooling hidden layer 1822b to every one of the output nodes in the output layer 1824. Using the example above, the input layer includes 28×28 nodes encoding the pixel intensities of the input image, the convolutional hidden layer 1822a includes 3×24×24 hidden feature nodes based on application of a 5×5 local receptive field (for the filters) to three activation maps, and the pooling hidden layer 1822b includes a layer of 3×12×12 hidden feature nodes based on application of max-pooling filter to 2×2 regions across each of the three feature maps. Extending this example, the output layer 1824 can include ten output nodes. In such an example, every node of the 3×12×12 pooling hidden layer 1822b is connected to every node of the output layer 1824.

The fully connected layer 1822c can obtain the output of the previous pooling hidden layer 1822b (which should represent the activation maps of high-level features) and determines the features that most correlate to a particular class. For example, the fully connected layer 1822c layer can determine the high-level features that most strongly correlate to a particular class, and can include weights (nodes) for the high-level features. A product can be computed between the weights of the fully connected layer 1822c and the pooling hidden layer 1822b to obtain probabilities for the different classes. For example, if the CNN 1800 is being used to predict that an object in a video frame is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 1824 can include an M-dimensional vector (in the prior example, M=10). M indicates the number of classes that the CNN 1800 has to choose from when classifying the object in the image. Other example outputs can also be provided. Each number in the M-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

Figure 19:
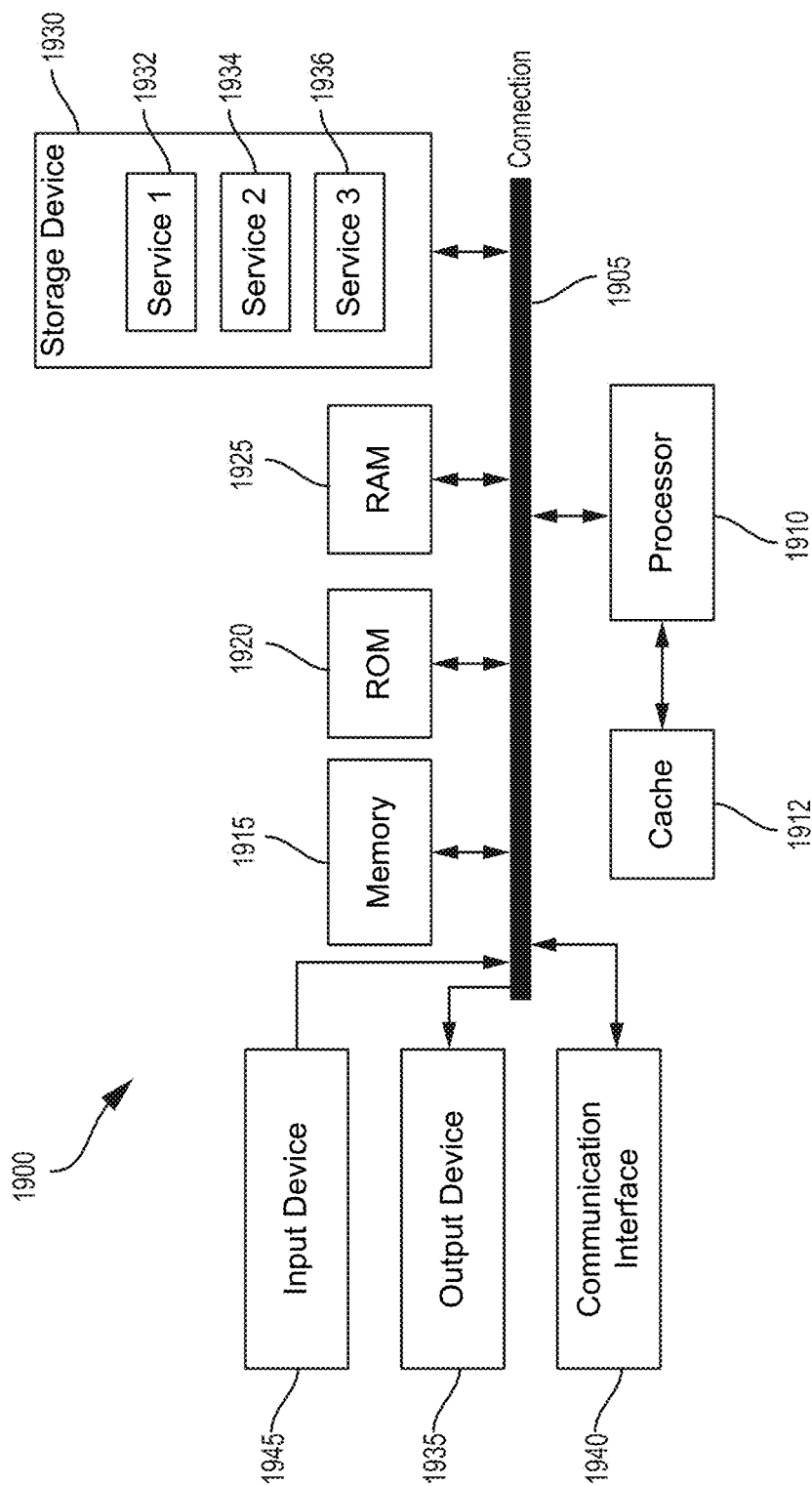
FIG. 19 is a diagram illustrating an example of a system for implementing certain aspects described herein.

FIG. 19 is a diagram illustrating an example of a system for implementing certain aspects of the present technology. In particular, FIG. 19 illustrates an example of computing system 1900, which can be for example any computing device making up internal computing system, a remote computing system, a camera, or any component thereof in which the components of the system are in communication with each other using connection 1905. Connection 1905 can be a physical connection using a bus, or a direct connection into processor 1910, such as in a chipset architecture. Connection 1905 can also be a virtual connection, networked connection, or logical connection.

In some aspects, computing system 1900 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example computing system 1900 includes at least one processing unit (CPU or processor) 1910 and connection 1905 that couples various system components including system memory 1915, such as ROM 1920 and RAM 1925 to processor 1910. Computing system 1900 can include a cache 1912 of high-speed memory connected directly with, in close proximity to, or integrated as part of processor 1910.

Processor 1910 can include any general purpose processor and a hardware service or software service, such as services 1932, 1934, and 1936 stored in storage device 1930, configured to control processor 1910 as well as a special-purpose processor where software instructions are incorporated into the actual processor design. Processor 1910 may essentially be a completely self-contained computing system, containing multiple cores or processors, a bus, memory controller, cache, etc. A multi-core processor may be symmetric or asymmetric.

To enable user interaction, computing system 1900 includes an input device 1945, which can represent any number of input mechanisms, such as a microphone for speech, a touch-sensitive screen for gesture or graphical input, keyboard, mouse, motion input, speech, etc. Computing system 1900 can also include output device 1935, which can be one or more of a number of output mechanisms. In some instances, multimodal systems can enable a user to provide multiple types of input/output to communicate with computing system 1900. Computing system 1900 can include communications interface 1940, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a Bluetooth® wireless signal transfer, a BLE wireless signal transfer, an IBEACON® wireless signal transfer, an RFID wireless signal transfer, near-field communications (NFC) wireless signal transfer, dedicated short range communication (DSRC) wireless signal transfer, 802.11 WiFi wireless signal transfer, WLAN signal transfer, Visible Light Communication (VLC), Worldwide Interoperability for Microwave Access (WiMAX), IR communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1940 may also include one or more Global Navigation Satellite System (GNSS) receivers or transceivers that are used to determine a location of the computing system 1900 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1930 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, RAM, static RAM (SRAM), dynamic RAM (DRAM), ROM, programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/Re-RAM), phase change memory (PCM), spin transfer torque RAM (STT-RAM), another memory chip or cartridge, and/or a combination thereof.

The storage device 1930 can include software services, servers, services, etc., that when the code that defines such software is executed by the processor 1910, it causes the system to perform a function. In some aspects, a hardware service that performs a particular function can include the software component stored in a computer-readable medium in connection with the necessary hardware components, such as processor 1910, connection 1905, output device 1935, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as CD or DVD, flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces can be configured to communicate and/or receive wired and/or wireless data, including data according to the 3G, 4G, 5G, and/or other cellular standard, data according to the Wi-Fi (802.11x) standards, data according to the Bluetooth™ standard, data according to the IP standard, and/or other types of data.

The components of the computing device can be implemented in circuitry. For example, the components can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but may have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as RAM such as synchronous dynamic random access memory (SDRAM), ROM, non-volatile random access memory (NVRAM), EEPROM, flash memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more DSPs, general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative examples of the disclosure include:

Aspect 1: A method for capturing one or more images, comprising: capturing an image associated with a first exposure; capturing a plurality of images associated with at least a second exposure, the second exposure being less than the first exposure; generating a combined image from the plurality of images associated with at least the second exposure; and generating an HDR image from the image associated with the first exposure and the combined image.

Aspect 2: The method of Aspect 1, wherein the plurality of images associated with at least the second exposure comprises at least one image captured before the image and at least one image captured after the image.

Aspect 3: The method of any of Aspects 1 to 2, wherein the plurality of images associated with at least the second exposure comprises at least two images associated the second exposure.

Aspect 4: The method of any of Aspects 1 to 3, wherein the plurality of images associated with at least the second exposure comprises at least one image associated the second exposure and at least one image associated a third exposure that is different from the second exposure and less than the first exposure.

Aspect 5: The method of any of Aspects 1 to 4, wherein generating the combined image comprises: merging the plurality of images based on a maximum saturation.

Aspect 6: The method of any of Aspects 1 to 5, wherein the plurality of images includes a plurality of regions, and wherein generating the combined image comprises: for each region of the plurality of regions in the plurality of images, determining a region from one image of the plurality of images having a highest luma value; and generating the combined image using the determined region.

Aspect 7: The method of any of Aspects 1 to 6, wherein each region is a single pixel.

Aspect 8: The method of any of Aspects 1 to 7, further comprising: determining scaled luma values of pixels in the combined image using an exposure ratio; determining that the image associated with the first exposure is saturated; and detecting motion in the combined image.

Aspect 9: The method of any of Aspects 1 to 8, wherein determining the scaled luma values includes multiplying luma values of the pixels in the combined image by the exposure ratio.

Aspect 10: The method of any of Aspects 1 to 9, wherein the exposure ratio is based on a comparison of the first exposure and at least the second exposure.

Aspect 11: The method of any of Aspects 1 to 10, wherein determining that the image associated with the first exposure is saturated comprises determining that a threshold number of pixels of the image have a luma value greater than a threshold value.

Aspect 12: The method of any of Aspects 1 to 11, wherein the motion is detected based on a comparison of the image associated with the first exposure to a particular image from the plurality of images associated with at least the second exposure.

Aspect 13: The method of any of Aspects 1 to 12, wherein the scaled luma values are less than luma values of pixels in the image associated with the first exposure when luma values of at least a threshold number of pixels of the image associated with the first exposure are greater than the scaled luma values.

Aspect 14: The method of any of Aspects 1 to 13, wherein detecting the motion in the combined image comprises: generating second scaled luma values at least in part by scaling a luma value of each pixel of a particular image from the plurality of images associated with at least the second exposure by the exposure ratio; determining a number of different pixels between the particular image and the image associated with the first exposure at least in part by comparing the scaled luma values of the particular image to a luma value of each pixel of the image associated with the first exposure; and detecting the motion when the number of different pixels is greater than a threshold value.

Aspect 15: The method of any of Aspects 1 to 14, further comprising: generating a motion mask from the plurality of images associated with at least the second exposure; determining a region in the motion mask corresponding to a first set of pixels at least in part by comparing the first set of pixels with the motion mask; determining a second set of pixels from one of the plurality of images that correspond to the region in the motion mask; and replacing the first set of pixels in the image associated with the first exposure with the second set of pixels.

Aspect 16: The method of any of Aspects 1 to 15, further comprising: generating a motion mask from the plurality of images associated with at least the second exposure; determining a region in the motion mask corresponding to a first set of pixels at least in part by comparing the first set of pixels with the motion mask; determining a second set of pixels from one of the plurality of images that correspond to the region in the motion mask; and determining to apply the second set of pixels of the region in the motion mask into the HDR image at least in part by comparing a quality of the second set of pixels to pixels within the motion mask.

Aspect 17: The method of any of Aspects 1 to 16, wherein comparing the quality of the second set of pixels to the pixels within the motion mask comprises: determining a number of pixels in the second set of pixels having one or more luma values that are less than a noise threshold; and comparing the number of pixels that are less than the noise threshold to a number of the pixels within the motion mask, wherein the second set of pixels are applied into the HDR image when the number of pixels that are less than the noise threshold is less than the number of pixels within the motion mask.

Aspect 18: A method for capturing one or more images, comprising: capturing an image associated with a first exposure; capturing a plurality of images associated with at least a second exposure, the second exposure being less than the first exposure; generating a maximum brightness image from the plurality of images at least in part by merging the plurality of images based on a maximum saturation to fill in background information to reduce ghosting; detecting a first set of pixels in the maximum brightness image are located in a dark region; identifying contours in a motion mask and copying content corresponding to the first set of pixels from one image of the plurality of images into the image associated with the first exposure or an image; and generating an HDR image at least in part by merging the image associated with the first exposure, the maximum brightness image, and the copied content.

Aspect 19: The method of Aspect 18, wherein copying content corresponding to the first set of pixels from the image associated with the first exposure or an image from the plurality of images comprises: determining whether a number of noisy pixels associated with the content from an image associated with the plurality of images is less than a number of first pixels in the maximum brightness image, wherein the noisy pixels fill regions of the image associated with the first exposure when the number of noisy pixels is less than the number of the first pixels.

Aspect 20: An apparatus for capturing one or more images comprising at least one memory (e.g., implemented in circuitry) and at least one processor (or multiple processors) coupled to the at least one memory. The at least one processor (or processors) is configured to: capture an image associated with a first exposure; capture a plurality of images associated with at least a second exposure, the second exposure being less than the first exposure; generate a combined image from the plurality of images associated with at least the second exposure; and generate an HDR image from the image associated with the first exposure and the combined image.

Aspect 21: The apparatus of Aspect 20, wherein the plurality of images associated with at least the second exposure comprises at least one image captured before the image and at least one image captured after the image.

Aspect 22: The apparatus of any of Aspects 20 to 21, wherein the plurality of images associated with at least the second exposure comprises at least two images associated the second exposure.

Aspect 23: The apparatus of any of Aspects 20 to 22, wherein the plurality of images associated with at least the second exposure comprises at least one image associated the second exposure and at least one image associated a third exposure that is different from the second exposure and less than the first exposure.

Aspect 24: The apparatus of any of Aspects 20 to 23, wherein the at least one processor is configured to: merge the plurality of images based on a maximum saturation.

Aspect 25: The apparatus of any of Aspects 20 to 24, wherein the plurality of images includes a plurality of regions, and wherein, to generate the combined image, the at least one processor is configured to: for each region of the plurality of regions in the plurality of images, determine a region from one image of the plurality of images having a highest luma value; and generate the combined image using the determined region.

Aspect 26: The apparatus of any of Aspects 20 to 25, wherein each region is a single pixel.

Aspect 27: The apparatus of any of Aspects 20 to 26, wherein the at least one processor is configured to: determine scaled luma values of pixels in the combined image using an exposure ratio; determine that the image associated with the first exposure is saturated; and detect motion in the combined image.

Aspect 28: The apparatus of any of Aspects 20 to 27, wherein, to determine the scaled luma values, the at least one processor is configured to multiply luma values of the pixels in the combined image by the exposure ratio.

Aspect 29: The apparatus of any of Aspects 20 to 28, wherein the exposure ratio is based on a comparison of the first exposure and at least the second exposure.

Aspect 30: The apparatus of any of Aspects 20 to 29, wherein, to determine that the image associated with the first exposure is saturated, the at least one processor is configured to determine that a threshold number of pixels of the image have a luma value greater than a threshold value.

Aspect 31: The apparatus of any of Aspects 20 to 30, wherein the at least one processor is configured to detect the motion based on a comparison of the image associated with the first exposure to a particular image from the plurality of images associated with at least the second exposure.

Aspect 32: The apparatus of any of Aspects 20 to 31, wherein the scaled luma values are less than luma values of pixels in the image associated with the first exposure when luma values of at least a threshold number of pixels of the image associated with the first exposure are greater than the scaled luma values.

Aspect 33: The apparatus of any of Aspects 20 to 32, wherein the at least one processor is configured to: generate second scaled luma values at least in part by scaling a luma value of each pixel of a particular image from the plurality of images associated with at least the second exposure by the exposure ratio; determine a number of different pixels between the particular image and the image associated with the first exposure at least in part by comparing the scaled luma values of the particular image to a luma value of each pixel of the image associated with the first exposure; and detect the motion when the number of different pixels is greater than a threshold value.

Aspect 34: The apparatus of any of Aspects 20 to 33, wherein the at least one processor is configured to: generate a motion mask from the plurality of images associated with at least the second exposure; determine a region in the motion mask corresponding to a first set of pixels at least in part by comparing the first set of pixels with the motion mask; determine a second set of pixels from one of the plurality of images that correspond to the region in the motion mask; and replace the first set of pixels in the image associated with the first exposure with the second set of pixels.

Aspect 35: The apparatus of any of Aspects 20 to 34, wherein the at least one processor is configured to: generate a motion mask from the plurality of images associated with at least the second exposure; determine a region in the motion mask corresponding to a first set of pixels at least in part by comparing the first set of pixels with the motion mask; determine a second set of pixels from one of the plurality of images that correspond to the region in the motion mask; and determine to apply the second set of pixels of the region in the motion mask into the HDR image at least in part by comparing a quality of the second set of pixels to pixels within the motion mask.

Aspect 36: The apparatus of any of Aspects 20 to 35, wherein the at least one processor is configured to: determine a number of pixels in the second set of pixels having one or more luma values that are less than a noise threshold; and compare the number of pixels that are less than the noise threshold to a number of the pixels within the motion mask, wherein the second set of pixels are applied into the HDR image when the number of pixels that are less than the noise threshold is less than the number of pixels within the motion mask.

Aspect 37: An apparatus for capturing one or more images comprising at least one memory (e.g., implemented in circuitry) and at least one processor (or multiple processors) coupled to the at least one memory. The at least one processor (or processors) is configured to: capture an image associated with a first exposure; capture a plurality of images associated with at least a second exposure, the second exposure being less than the first exposure; generate a maximum brightness image from the plurality of images at least in part by merging the plurality of images based on a maximum saturation to fill in background information to reduce ghosting; detect a first set of pixels in the maximum brightness image are located in a dark region; identify contours in a motion mask and copy content corresponding to the first set of pixels from one image of the plurality of images into the image associated with the first exposure or an image; and generate an HDR image at least in part by merging the image associated with the first exposure, the maximum brightness image, and the copied content.

Aspect 38: The apparatus of Aspect 37, wherein the at least one processor is configured to determine whether a number of noisy pixels associated with the content from an image associated with the plurality of images is less than a number of first pixels in the maximum brightness image, wherein the noisy pixels fill regions of the image associated with the first exposure when the number of noisy pixels is less than the number of the first pixels.

Aspect 39: A non-transitory computer-readable medium of a network entity having stored thereon instructions that, when executed by one or more processors, cause the one or more processors to perform operations according to any of Aspects 1 to 17.

Aspect 40: An apparatus for wireless communications comprising one or more means for performing operations according to any of Aspects 1 to 17.

Aspect 41: A non-transitory computer-readable medium of a network entity having stored thereon instructions that, when executed by one or more processors, cause the one or more processors to perform operations according to any of Aspects 18 to 19.

Aspect 42: An apparatus for wireless communications comprising one or more means for performing operations according to any of Aspects 18 to 19.

What is claimed is:

1. A method for capturing one or more images, comprising:
   capturing an image associated with a first exposure;
   capturing a plurality of images associated with at least a second exposure, the second exposure being less than the first exposure, wherein the plurality of images includes a plurality of regions;
   for each region of the plurality of regions in the plurality of images, determining a region from a respective image of the plurality of images having a highest luma value;
   generating a combined image from the plurality of images using the determined region from each respective image having the highest luma value for each region of the plurality of regions; and
   generating a high dynamic range (HDR) image from the image associated with the first exposure and the combined image.

2. The method of claim 1, wherein the plurality of images associated with at least the second exposure comprises at least one image captured before the image and at least one image captured after the image.

3. The method of claim 1, wherein the plurality of images associated with at least the second exposure comprises at least two images associated the second exposure.

4. The method of claim 1, wherein the plurality of images associated with at least the second exposure comprises at least one image associated the second exposure and at least one image associated a third exposure that is different from the second exposure and less than the first exposure.

5. The method of claim 1, wherein generating the combined image comprises:
   merging the plurality of images based on a maximum saturation.

6. The method of claim 1, wherein each region is a single pixel.

7. The method of claim 1, further comprising:
   determining scaled luma values of pixels in the combined image using an exposure ratio;
   determining that the image associated with the first exposure is saturated; and
   detecting motion in the combined image.

8. The method of claim 7, wherein determining the scaled luma values includes multiplying luma values of the pixels in the combined image by the exposure ratio.

9. The method of claim 7, wherein the exposure ratio is based on a comparison of the first exposure and at least the second exposure.

10. The method of claim 7, wherein determining that the image associated with the first exposure is saturated comprises determining that a threshold number of pixels of the image have a luma value greater than a threshold value.

11. The method of claim 7, wherein the motion is detected based on a comparison of the image associated with the first exposure to a particular image from the plurality of images associated with at least the second exposure.

12. The method of claim 7, wherein the scaled luma values are less than luma values of pixels in the image associated with the first exposure when luma values of at least a threshold number of pixels of the image associated with the first exposure are greater than the scaled luma values.

13. The method of claim 7, wherein detecting the motion in the combined image comprises:
generating second scaled luma values at least in part by scaling a luma value of each pixel of a particular image from the plurality of images associated with at least the second exposure by the exposure ratio;
determining a number of different pixels between the particular image and the image associated with the first exposure at least in part by comparing the scaled luma values of the particular image to a luma value of each pixel of the image associated with the first exposure; and
detecting the motion when the number of different pixels is greater than a threshold value.

14. The method of claim 7, further comprising:
generating a motion mask from the plurality of images associated with at least the second exposure;
determining a region in the motion mask corresponding to a first set of pixels at least in part by comparing the first set of pixels with the motion mask;
determining a second set of pixels from one of the plurality of images that correspond to the region in the motion mask; and
replacing the first set of pixels in the image associated with the first exposure with the second set of pixels.

15. The method of claim 7, further comprising:
generating a motion mask from the plurality of images associated with at least the second exposure;
determining a region in the motion mask corresponding to a first set of pixels at least in part by comparing the first set of pixels with the motion mask;
determining a second set of pixels from one of the plurality of images that correspond to the region in the motion mask; and
determining to apply the second set of pixels of the region in the motion mask into the HDR image at least in part by comparing a quality of the second set of pixels to pixels within the motion mask.

16. The method of claim 15, wherein comparing the quality of the second set of pixels to the pixels within the motion mask comprises:
determining a number of pixels in the second set of pixels having one or more luma values that are less than a noise threshold; and
comparing the number of pixels that are less than the noise threshold to a number of the pixels within the motion mask,
wherein the second set of pixels are applied into the HDR image when the number of pixels that are less than the noise threshold is less than the number of pixels within the motion mask.

17. An apparatus for capturing one or more images, comprising:
at least one memory; and
at least one processor coupled to at least one memory and configured to:
capture an image associated with a first exposure;
capture a plurality of images associated with at least a second exposure, the second exposure being less than the first exposure, wherein the plurality of images includes a plurality of regions;
for each region of the plurality of regions in the plurality of images, determine a region from a respective image of the plurality of images having a highest luma value;
generate a combined image from the plurality of images using the determined region from each respective image having the highest luma value for each region of the plurality of regions; and
generate a high dynamic range (HDR) image from the image associated with the first exposure and the combined image.

18. The apparatus of claim 17, wherein the plurality of images associated with at least the second exposure comprises at least one image captured before the image and at least one image captured after the image.

19. The apparatus of claim 17, wherein the plurality of images associated with at least the second exposure comprises at least two images associated the second exposure.

20. The apparatus of claim 17, wherein the plurality of images associated with at least the second exposure comprises at least one image associated the second exposure and at least one image associated a third exposure that is different from the second exposure and less than the first exposure.

21. The apparatus of claim 17, wherein the at least one processor is configured to:
merge the plurality of images based on a maximum saturation.

22. The apparatus of claim 17, wherein each region is a single pixel.

23. The apparatus of claim 17, wherein the at least one processor is configured to:
determine scaled luma values of pixels in the combined image using an exposure ratio;
determining that the image associated with the first exposure is saturated; and
detect motion in the combined image.

24. The apparatus of claim 23, wherein, to determine the scaled luma values, the at least one processor is configured to multiply luma values of the pixels in the combined image by the exposure ratio.

25. The apparatus of claim 23, wherein the exposure ratio is based on a comparison of the first exposure and at least the second exposure.

26. The apparatus of claim 23, wherein, to determine that the image associated with the first exposure is saturated, the at least one processor is configured to determine that a threshold number of pixels of the image have a luma value greater than a threshold value.

27. The apparatus of claim 23, wherein the at least one processor is configured to detect the motion based on a comparison of the image associated with the first exposure to a particular image from the plurality of images associated with at least the second exposure.

28. The apparatus of claim 23, wherein the scaled luma values are less than luma values of pixels in the image associated with the first exposure when luma values of at least a threshold number of pixels of the image associated with the first exposure are greater than the scaled luma values.

29. The apparatus of claim 23, wherein, to detect the motion in the combined image, the at least one processor is configured to:
generate second scaled luma values at least in part by scaling a luma value of each pixel of a particular image from the plurality of images associated with at least the second exposure by the exposure ratio;
determine a number of different pixels between the particular image and the image associated with the first exposure at least in part by comparing the scaled luma values of the particular image to a luma value of each pixel of the image associated with the first exposure; and detect the motion when the number of different pixels is greater than a threshold value.

30. The apparatus of claim 23, wherein the at least one processor is configured to:
generate a motion mask from the plurality of images associated with at least the second exposure;
determine a region in the motion mask corresponding to a first set of pixels at least in part by comparing the first set of pixels with the motion mask;
determine a second set of pixels from one of the plurality of images that correspond to the region in the motion mask; and
replace the first set of pixels in the image associated with the first exposure with the second set of pixels.

* * * * *